(12) United States Patent
Takayama

(10) Patent No.: US 8,515,349 B2
(45) Date of Patent: *Aug. 20, 2013

(54) COMMUNICATION SYSTEM, COMMUNICATION APPARATUS, COMMUNICATION METHOD, AND PROGRAM TO REDUCE COMMUNICATION TIME IN NEAR FIELD COMMUNICATIONS

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 13/043,008

(22) Filed: Mar. 8, 2011

(65) Prior Publication Data
US 2011/0159816 A1 Jun. 30, 2011

Related U.S. Application Data

(63) Continuation of application No. 11/997,349, filed as application No. PCT/JP2006/314982 on Jul. 28, 2006, now Pat. No. 7,925,215.

(30) Foreign Application Priority Data

Aug. 1, 2005 (JP) ................ 2005-222469

(51) Int. Cl.
*H04B 7/00* (2006.01)
(52) U.S. Cl.
USPC .............. 455/41.2; 455/41.1; 340/10.1
(58) Field of Classification Search
USPC ............. 455/41.1–41.3; 340/10.1, 539.1, 340/539.11; 235/451, 492
See application file for complete search history.

(56) References Cited

U.S. PATENT DOCUMENTS 7,925,215 B2 * 4/2011 Takayama ............... 455/41.2
2003/0094491 A1 * 5/2003 Nakabe et al. ........... 235/451
(Continued)

FOREIGN PATENT DOCUMENTS

JP 2004 185601 7/2004
JP 2004 215225 7/2004
JP 2005 184761 7/2005

OTHER PUBLICATIONS

"International Standard: Information Technology—Telecommunications and Information Exchange Between Systems—Near Field Communication—Interface and Protocol (NFCIP-1)", ISO/IEC 18092, pp. II to VI and 1 to 58, 2004.

(Continued)

*Primary Examiner* — Angelica M Perez
(74) *Attorney, Agent, or Firm* — Oblon, Spivak, McClelland, Maier & Neustadt, L.L.P.

(57) ABSTRACT

A communication system includes an initiator that transmits a command via an electromagnetic wave. The communication system also includes a target that transmits a response to the command by load-modulating the electromagnetic wave. The initiator performs a first mode communication to acquire real data. The response is transmitted by the target at a timing of any one of one or more time slots and includes the real data. The initiator has a unit that causes the command to be transmitted with a first value in time slot information when the first mode communication is performed. The target has a unit that recognizes the time slot information included in the command from the initiator. The target also has a unit that causes the response including the real data to be transmitted at a timing of a preset time slot, when the time slot information has the first value.

7 Claims, 31 Drawing Sheets

COMMUNICATION SYSTEM

(56) References Cited

U.S. PATENT DOCUMENTS

| | | |
|---|---|---|
| 2004/0117301 A1* | 6/2004 | Fujisawa et al. .............. 705/39 |
| 2005/0070270 A1* | 3/2005 | Akiyama .................... 455/425 |
| 2005/0127180 A1* | 6/2005 | Matsumoto et al. ......... 235/451 |
| 2006/0163365 A1* | 7/2006 | Nakabe ....................... 235/492 |
| 2010/0105324 A1* | 4/2010 | Takayama ................... 455/41.2 |

OTHER PUBLICATIONS

"ECMA: Near Field Communication Wired Interface (NFC-WI)",Ecma-373, pp. I to II and 1 to 17, 2006.

* cited by examiner

COMMUNICATION SYSTEM

FIG. 9

| PREAMBLE (MINIMUM OF 48 BITS) | SYNCHRO-NIZATION (16 BITS) | LENGTH (8 BITS) | PAYLOAD | | | | CRC (16 BITS) |
|---|---|---|---|---|---|---|---|
| | | | "00" | "FF" | "FF" | "00" | TSN | |

FIG. 10

| PREAMBLE (MINIMUM OF 48 BITS) | SYNCHRO-NIZATION (16 BITS) | LENGTH (8 BITS) | PAYLOAD ||| CRC (16 BITS) |
|---|---|---|---|---|---|---|
| | | | "01" | NFCID2 | Pad | |

FIG. 11

| NAME | DEFINITION |
|---|---|
| ATR_REQ | Attribute Request (TRANSMITTED BY INITIATOR) |
| ATR_RES | Attribute Response (TRANSMITTED BY TARGET) |
| WUP_REQ | Wakeup Request (TRANSMITTED BY INITIATOR ONLY WHEN IN ACTIVE MODE) |
| WUP_RES | Wakeup Response (TRANSMITTED BY TARGET ONLY WHEN IN ACTIVE MODE) |
| PSL_REQ | Parameter selection Request (TRANSMITTED BY INITIATOR) |
| PSL_RES | Parameter selection Response (TRANSMITTED BY TARGET) |
| DEP_REQ | Data Exchange Protocol Request (TRANSMITTED BY INITIATOR) |
| DEP_RES | Data Exchange Protocol Response (TRANSMITTED BY TARGET) |
| DSL_REQ | Deselect Request (TRANSMITTED BY INITIATOR) |
| DSL_RES | Deselect Response (TRANSMITTED BY TARGET) |
| RLS_REQ | Release Request (TRANSMITTED BY INITIATOR) |
| RLS_RES | Release Response (TRANSMITTED BY TARGET) |

COMMUNICATION SYSTEM

COMMUNICATION SYSTEM

FIG. 29

| TIME SLOT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| CHANNEL #1 | | × | | | | | | | | | | × | | | | | | | | × | × | | × |
| CHANNEL #2 | | | × | | × | | × | | | | | | | × | | | | × | | | | × | |
| CHANNEL #3 | | | | | | × | | | | × | | | × | | | × | | | | | | | |
| CHANNEL #4 | | | | × | | | | × | | | × | | | | × | | | | × | | | | |

COMMUNICATION SYSTEM, COMMUNICATION APPARATUS, COMMUNICATION METHOD, AND PROGRAM TO REDUCE COMMUNICATION TIME IN NEAR FIELD COMMUNICATIONS

CROSS REFERENCES TO RELATED APPLICATIONS

This application is a continuation of and claims the benefit of priority under 35 U.S.C. §120 from U.S. Ser. No. 11/997, 349, filed Dec. 8, 2008, the entire contents of which are incorporated herein by reference. The U.S. Ser. No. 11/997, 349 is a national stage of PCT Application No. PCT/JP2006/314982, filed Jul. 28, 2006, and claims the benefit of priority under 35 U.S.C. §119 from Japanese Patent Application 2005-222469, filed on Aug. 1, 2005.

TECHNICAL FIELD

The present invention relates to a communication system, a communication device, a communication method, and a program, and more specifically to a communication system, a communication device, a communication method, and a program which make it possible to achieve a reduction in communication time in near field communication.

BACKGROUND ART

As a system for performing near field communication, for example, an IC (Integrated Circuit) system is widely known. In an IC card system, a R/W (Reader/Writer) generates an electromagnetic wave to form a so-called RF (Radio Frequency) field (magnetic field). When an IC card is brought close to the R/W, power is supplied to the IC card by electromagnetic induction and data transfer is performed between the IC card and the R/W.

As a communication protocol for performing near field communication typically represented by an IC card system, for example, NFCIP (Near Field Communication Interface and Protocol)-1 is known. NFCIP-1 has also become an international standard as ISO/IEC 18092.

NFCIP-1 specifies the following modes: an active mode that is a communication mode in which each of a plurality of communication devices that transmit and receive data outputs an electromagnetic wave, and modulates the electromagnetic wave to thereby perform transmission of data; and a passive mode that is a communication mode in which one communication device of a plurality of communication devices outputs an electromagnetic wave and modulates the electromagnetic wave to thereby perform transmission of data, and in which another communication device of the plurality of communication devices performs load modulation on the electromagnetic wave outputted by the one communication device to thereby perform transmission of data. A plurality of communication devices compliant with NFCIP-1 communicate with each other in one of the communication modes of the active mode and the passive mode (such a communication method is described in, for example, Japanese Patent Application Publication Laid-open No. 2004-215225).

When a communication device that outputs an electromagnetic wave to start communication, and transmits a command via the electromagnetic wave is called an initiator, and a communication device that transmits (returns) a response to the command transmitted by the initiator is called a target, in communication in passive move, a process called an SDD (Single Device Detection) is performed, whereby the initiator identifies each one of a plurality of targets existing around the initiator.

In an SDD process, the initiator transmits a command requesting for an ID (identification) for identifying a target. Then, the target determines a time slot for transmitting a response in reply to the command from the initiator, by a random number, and transmits a response including an ID for identifying the target at the timing of the time slot determined by the random number.

Since the target determines the time slot for transmitting a response by a random number, it is possible to reduce the probability of a collision that results from responses from two or more targets being transmitted at the timing of the same time slot, in a case where a plurality of targets exist around the initiator.

By receiving a response transmitted from the target, the initiator acquires an ID included in that response, and identifies the target on the basis of that ID. Thereafter, the initiator specifies (designates) the target with which it communicates on the basis of, for example, the ID acquired by the SDD process, and exchanges real data with the target identified by that ID.

DISCLOSURE OF INVENTION

Problems to be Solved by the Invention

As described above, in passive mode communication, by taking into consideration situations where a plurality of targets exist around the initiator, an SDD process using time slots is performed to identify the plurality of targets, and then exchange of real data is performed between the initiator and the targets.

Therefore, in passive mode communication according to NFCIP-1, an SDD process is always performed even when, for example, NFCIP-1 is applied to an application which assumes that there is a single target that communicates with the initiator. Thereafter, exchange of real data is performed between the initiator and the target. Accordingly, in passive mode communication according to NFCIP-1, up to a certain amount of communication time is required even for transmitting only a small amount of data.

The present invention has been made in view of the abovementioned circumstances, and aims to achieve a reduction in communication time.

Means for Solving the Problems

A communication system according to a first aspect of the present invention includes: an initiator as a communication device that starts communication by outputting an electromagnetic wave, and transmits a command via the electromagnetic wave; and a target as a communication device that transmits a response to the command by load-modulating the electromagnetic wave. The initiator has means for causing a command where a first value is set in time slot information to be transmitted when, of passive mode communication and simple mode communication, the passive mode communication is performed, the passive mode communication including transmitting the command including the time slot information related to a time slot, and receiving a response to the command, the response being transmitted by the target at a timing of any one of one or more time slots and including an ID (Identification) for identifying the target, to acquire the ID for identifying the target, and identify the target by the ID, the simple mode communication including transmitting the command, and receiving a response to the command, the response being transmitted by the target at a timing of any one of one or more time slots and including real data, to acquire the real data, and means for causing the command where a second value different from the first value is set in the time slot information to be transmitted when the simple mode communication is performed. The target has means for recognizing the time slot information included in the command from the initiator, means for determining a time slot for transmitting the response by a random number, and causing the response including the ID for identifying the target to be transmitted at a timing of the time slot determined by the random number, when the time slot information has the first value, and means for causing the response including the real data to be transmitted at a timing of a preset time slot, when the time slot information has the second value.

In the communication system according to the first aspect as described above, on the initiator side, the command where the first value is set in the time slot information is transmitted when the passive mode communication is performed, and the command where a second value different from the first value is set in the time slot information is transmitted when the simple mode communication is performed. On the other hand, on the target size, the time slot information included in the command from the initiator is recognized, and when the time slot information has the first value, the time slot for transmitting the response is determined by a random number, and a response including an ID for identifying the target is transmitted at the timing of the time slot. When the time slot information has the second value, a response including the real data is transmitted at the timing of a preset time slot.

A communication device according to a second aspect of the present invention relates to a communication device which starts communication by outputting an electromagnetic wave, and transmits a command by the electromagnetic wave, including: a first transmission control means for causing a command where a first value is set in time slot information to be transmitted when, of passive mode communication and simple mode communication, the passive mode communication is performed, the passive mode communication including transmitting the command including the time slot information related to a time slot, and receiving a response to the command, the response being transmitted by a target, which is a communication device that transmits the response to the command by load-modulating the electromagnetic wave, at a timing of any one of one or more time slots and including an ID (Identification) for identifying the target, to acquire the ID for identifying the target, and identify the target by the ID, the simple mode communication including transmitting the command, and receiving a response to the command, the response being transmitted by the target at a timing of any one of one or more time slots and including real data, to acquire the real data, and a second transmission control means for causing the command where a second value different from the first value is set in the time slot information to be transmitted when the simple mode communication is performed.

A communication method or a program according to the second aspect of the present invention relates to a communication method for a communication device that starts communication by outputting an electromagnetic wave, and transmits a command via the electromagnetic wave, or a program which is executed by a computer that controls the communication device, including the steps of: causing a command where a first value is set in time slot information to be transmitted when, of passive mode communication and simple mode communication, the passive mode communication is performed, the passive mode communication including transmitting the command including the time slot information related to a time slot, and receiving a response to the command, the response being transmitted by a target, which is a communication device that transmits the response to the command by load-modulating the electromagnetic wave, at a timing of any one of one or more time slots and including an ID (Identification) for identifying the target, to acquire the ID for identifying the target, and identify the target by the ID, the simple mode communication including transmitting the command, and receiving a response to the command, the response being transmitted by the target at a timing of any one of one or more time slots and including real data, to acquire the real data; and causing the command where a second value different from the first value is set in the time slot information to be transmitted when the simple mode communication is performed.

In the communication device, the communication method, or the program according to the second aspect of the present invention as described above, the command where a first value is set in the time slot information is transmitted when the passive mode communication is performed, and the command where a second value different from the first value is set in the time slot information is transmitted when the simple mode communication is performed.

A communication device according to a third aspect of the present invention relates to a communication device which transmits, to an initiator as a communication device that starts communication by outputting an electromagnetic wave and transmits a command via the electromagnetic wave, a response to the command by load-modulating the electromagnetic wave, including, when the initiator can perform passive mode communication including transmitting a command including time slot information related to a time slot, and receiving a response to the command, the response being transmitted by the communication device at a timing of any one of one or more time slots and including an ID (Identification) for identifying the communication device, to acquire the ID for identifying the communication device, and identify the communication device by the ID, and simple mode communication including transmitting the command, and receiving a response to the command, the response being transmitted by the communication device at a timing of any one of one or more time slots and including real data, to acquire the real data, in the passive mode communication, the command where a first value is set in the time slot information is transmitted, and in the simple mode communication, the command where a second value different from the first value is set in the time slot information is transmitted: recognizing means for recognizing the time slot information included in the command from the initiator; a first transmission control means for determining a time slot for transmitting the response by a random number, and causing the response including the ID for identifying the communication device to be transmitted at a timing of the time slot determined by the random number, when the time slot information has the first value; and a second transmission control means for causing the response including the real data to be transmitted at a timing of a preset time slot, when the time slot information has the second value.

A communication method or a program according to the third aspect of the present invention relates to a communication method for a communication device, the communication device transmitting, to an initiator as a communication device that starts communication by outputting an electromagnetic wave and transmits a command via the electromagnetic wave, a response to the command by load-modulating the electromagnetic wave, or a program which is executed by a computer that controls the communication device, including the steps of, when the initiator can perform passive mode communication including transmitting a command including time slot information related to a time slot, and receiving a response to the command, the response being transmitted by the communication device at a timing of any one of one or more time slots and including an ID (Identification) for identifying the communication device, to acquire the ID for identifying the communication device, and identify the communication device by the ID, and simple mode communication including transmitting the command, and receiving a response to the command, the response being transmitted by the communication device at a timing of any one of one or more time slots and including real data, to acquire the real data, in the passive mode communication, the command where a first value is set in the time slot information is transmitted, and in the simple mode communication, the command where a second value different from the first value is set in the time slot information is transmitted: recognizing the time slot information included in the command from the initiator; determining a time slot for transmitting the response by a random number, and causing the response including the ID for identifying the communication device to be transmitted at a timing of the time slot determined by the random number, when the time slot information has the first value; and causing the response including the real data to be transmitted at a timing of a preset time slot, when the time slot information has the second value.

In the communication device, the communication method, or the program according to the third aspect of the present invention as described above, the time slot information included in the command from the initiator is recognized. Then, when the time slot information has the first value, the time slot for transmitting the response is determined by a random number, and a response including an ID for identifying the target is transmitted at the timing of the time slot. Further, when the time slot information has the second value, a response including the real data is transmitted at the timing of a preset time slot.

Advantages

According to the present invention, communication can be performed. In particular, a reduction in communication time can be achieved.

BRIEF DESCRIPTION OF THE DRAWINGS

FIG. 9 is a diagram showing the format of a polling request frame.
FIG. 10 is a diagram showing the format of a polling response frame.
FIG. 11 is a diagram showing a list of commands and responses.
FIG. 29 is a diagram showing a channel table.

Figure 1:
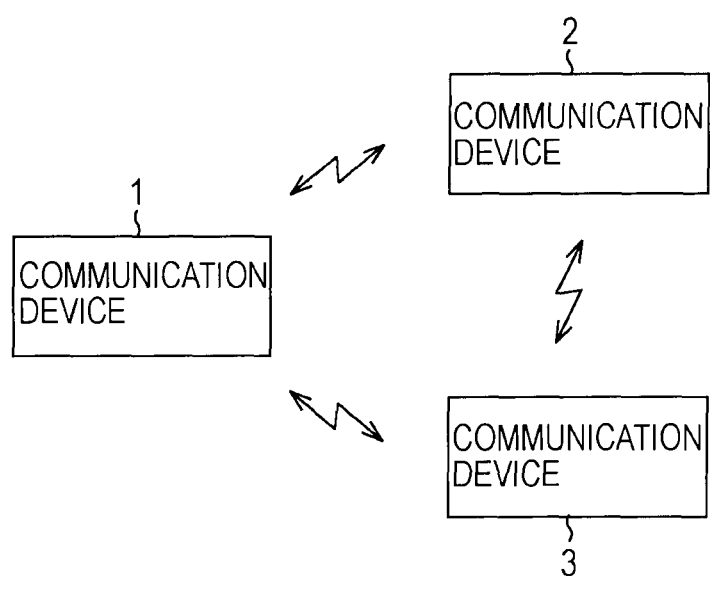
FIG. 1 is a diagram showing an example of the configuration of a communication system that performs near field communication compliant with NFCIP-1.

REFERENCE NUMERALS 11, 12, 13 communication device
21 antenna
22 receiving section
23 demodulating section
24 decoding section
25 data processing section
26 encoding section
27 electromagnetic wave output section
29 control section
29A CPU
29B EEPROM
30 power supply section
41 antenna
42 receiving section
43 demodulating section
44 decoding section 45 data processing section
46 encoding section
47 load-modulating section
48 power supply section
49 control section
49A CPU
49B EEPROM
101, 102 communication device

BEST MODE FOR CARRYING OUT THE INVENTION

Now, before describing embodiments of the present invention with reference to the drawings, a brief description will be given of NFCIP-1 (ISO/IEC 18092) that is a communication protocol for performing near field communication.

FIG. 1 shows an example of the configuration of a communication system (system refers to a logical assembly of a plurality of devices, and it does not matter whether or not individual component devices are present within the same housing) that performs near field communication compliant with NFCIP-1.

Herein, near field communication refers to communication that can be performed when the distance between communicating devices becomes within several 10 cms, for example, and includes communication performed between (housings of) communicating devices that are in contact with each other.

In FIG. 1, the communication system includes three communication devices 1, 2, 3. Each of the communication devices 1 to 3 can perform near field communication (NFC) based on an electromagnetic induction using a carrier wave with a single frequency $f_c$. In NFCIP-1, 13.56 MHz as an ISM (Industrial Scientific Medical) band is specified as the frequency $f_c$ of a carrier wave.

It should be noted that the communication system shown in FIG. 1 is not only applicable to an IC card system in which one or more of the communication devices 1 to 3 serves as a reader/writer and one or more of the other devices serves as an IC card, but each of the communication devices 1 to 3 can also be built in a PDA (Personal Digital Assistant), a PC (Personal Computer), a portable telephone, a wristwatch, a pen, or the like. That is, the communication devices 1 to 3 are devices that perform near field communication, and not limited to an IC card or reader/writer of an IC card system.

The communication devices 1 to 3 can perform communication in two communication modes. The two communication modes are a passive communication mode and an active communication mode. Now, communication that takes place between, for example, the communication devices 1 and 2 of the communication devices 1 to 3 will be considered. In the passive mode, as in the IC card system according to the related art described above, one of the communication devices 1 and 2, for example, the communication device 1 transmits data to the other communication device, the communication device 2, by modulating (a carrier wave corresponding to) a self-generated electromagnetic wave with data, and the communication device 2 transmits data to the communication device 1 by load-modulating (a carrier wave corresponding to) an electromagnetic wave generated by the communication device 1 with data.

On the other hand, in the active mode, each of the communication devices 1 and 2 transmits data by modulating (a carrier wave corresponding to) a self-generated electromagnetic wave with data.

In near field communication based on electromagnetic induction, as described above, a device that starts communication by outputting an electromagnetic wave first, i.e., a device that takes the initiative in communication, is referred to as an "initiator". In near field communication, the initiator transmits a command to a communicating party, and the communicating party returns a response to the command. The communicating party that returns a response to the command from the initiator is referred to as a "target".

For instance, assuming that the communication device 1 starts outputting an electromagnetic wave to start communication with the communication device 2, the communication device 1 is the initiator, and the communication device 2 is the target.

Figure 2:
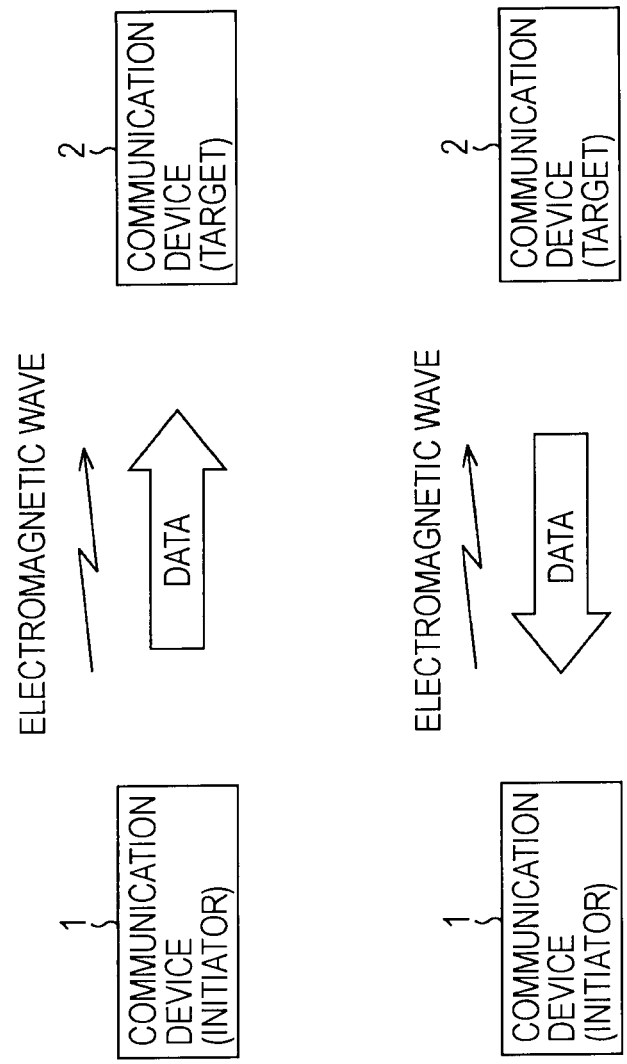
FIG. 2 is a diagram illustrating a passive mode.

In the passive mode, as shown in FIG. 2, the communication device 1 as the initiator continues to output an electromagnetic wave, and the communication device 1 modulates the electromagnetic wave outputted by itself with data to thereby transmit data to the communication device 2 as the target. The communication device 2 load-modulates the electromagnetic wave outputted by the communication device 1 as the target with data, thereby transmitting data to the communication device 1.

Figure 3:
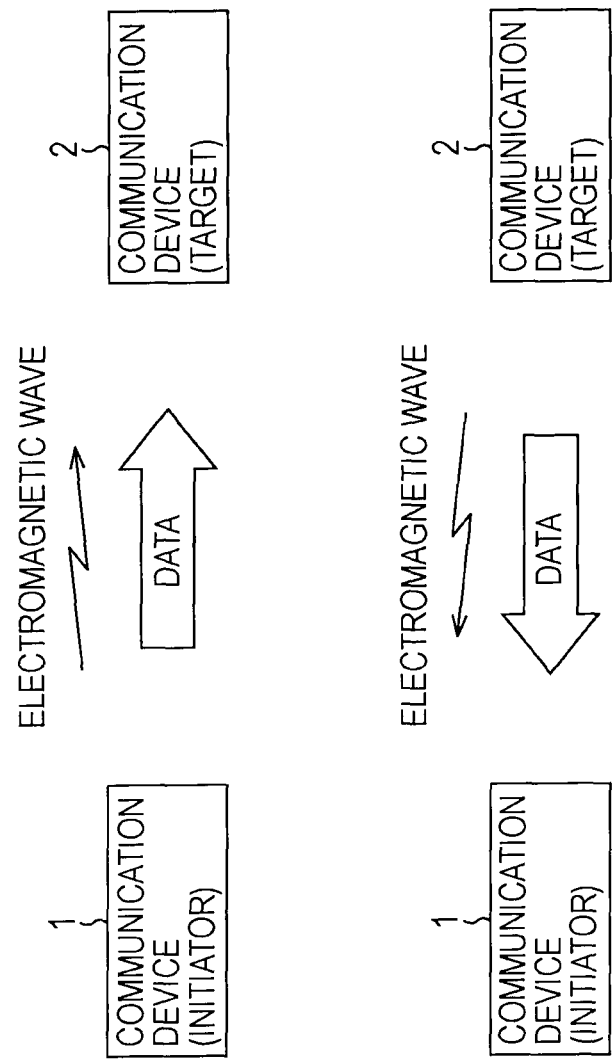
FIG. 3 is a diagram illustrating an active mode.

On the other hand, in the active mode, as shown in FIG. 3, when the communication device 1 as the initiator itself is to transmit data, the communication device 1 starts outputting an electromagnetic wave by itself, and then modulates the electromagnetic wave with data, thereby transmitting data to the communication device 2 as the target. Then, upon finishing transmission of data, the communication device 1 stops outputting an electromagnetic wave. Likewise, when the communication device 2 as the target itself is to transmit data, the communication device 2 starts outputting an electromagnetic wave by itself, and then modulates the electromagnetic wave with data, thereby transmitting data to the communication device 2 as the target. Then, upon finishing transmission of data, the communication device 2 stops outputting an electromagnetic wave.

While the three communication devices 1 to 3 constitute the communication system in FIG. 1, the number of communication devices constituting the communication system is not limited to three, but may be 2 or 4 or more. Also, the communication system can be configured to include, for example, an IC card or reader/writer constituting an IC card system of the related art, in addition to communication devices.

Any one of the communication devices 1 to 3 can become the initiator by first outputting an electromagnetic wave to start communication. Further, in the active mode, each of the communication devices 1 to 3 outputs an electromagnetic wave by itself regardless of whether it is the initiator or the target.

Accordingly, if, in a state with the communication devices 1 to 3 devices located close to each other, two or more of the communication devices simultaneously output electromagnetic waves, a collision occurs, which makes it impossible to perform communication correctly.

Accordingly, NFCIP-1 specifies that a communication device that is to start outputting an electromagnetic wave detects whether or not (a RF field generated by) an electromagnetic wave from another device exists, and starts outputting an electromagnetic wave only when no such electromagnetic wave exists, thereby preventing collision. It should be noted here that the above-mentioned process of detecting whether or not an electromagnetic wave from another device exists and starting the output of an electromagnetic wave only when no such electromagnetic wave exists, is referred to as an RFCA (RF Collision Avoidance) process because the process is aimed at preventing collision.

Of various types of RFCA process, an RFCA process which is performed first by a communication device (in FIG. 1, one or more of the communication devices 1 to 3) that is to become the initiator by outputting an electromagnetic wave to start communication, is referred to as an initial RFCA process.

Figure 4:
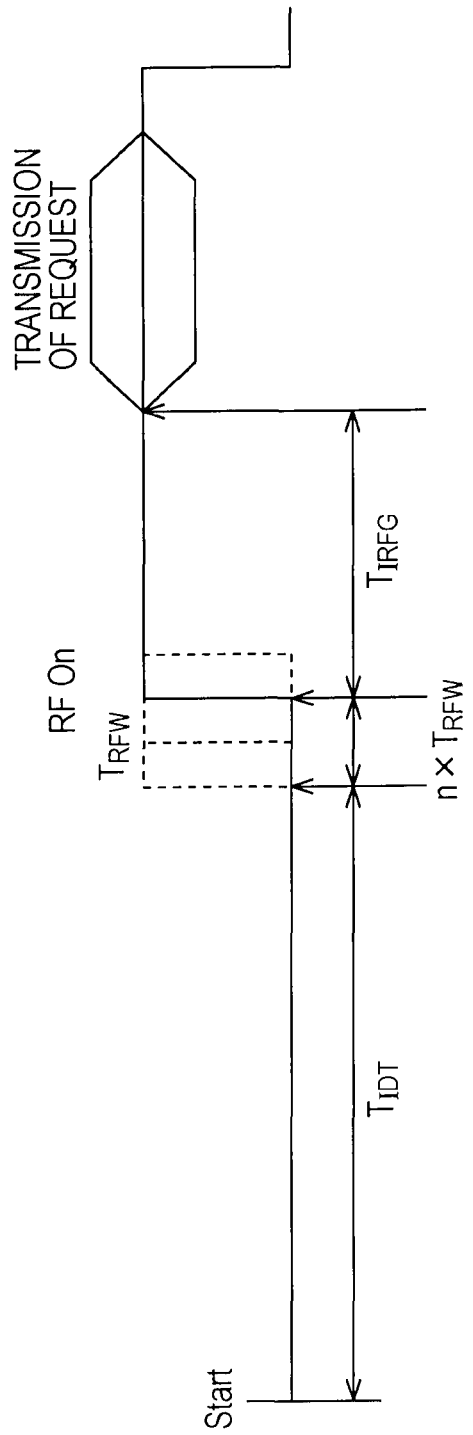
FIG. 4 is a timing chart illustrating an initial RFCA process.

Referring to FIG. 4, the initial RFCA process will be described.

FIG. 4 shows an electromagnetic wave whose output is started by the initial RFCA process. In FIG. 4, the horizontal axis represents time, and the vertical axis represents the level of an electromagnetic wave outputted by a communication device.

A communication device that is to become an initiator constantly detects for an electromagnetic wave from another device. If an electromagnetic wave from another device has not been detected continuously for a time $T_{IDT}+n \times T_{RFW}$, the communication device starts outputting an electromagnetic wave, and after a time $T_{IRFG}$ has elapsed since the output, the communication device starts transmission (Send Request) of data (including a command (request)).

Here, $T_{IDT}$ in the time $T_{IDT}+n \times T_{RFW}$ is called initial delay time. NFCIP-1 specifies, by using the frequency $f_c$ of a carrier wave, that $T_{IDT}$ be a value larger than $4096/f_c$. n is, for example, an integer of 0 to 3, and is generated by using a random number. $T_{RFW}$ is called RF waiting time, and $512/f_c$, for example, is adopted as its value. The time $T_{IRFG}$ is called initial guard time, and a value larger than 5 ms, for example, is adopted as its value.

By adopting n as a random number for the time $T_{IDT}+n \times T_{RFW}$ during which an electromagnetic wave should not be detected, the possibility of a plurality of communication devices starting outputting electromagnetic waves at the same timing is reduced.

Next, referring to FIGS. 5 to 13, a description will be given of communication in passive mode according to NFCIP-1.

Figure 5:
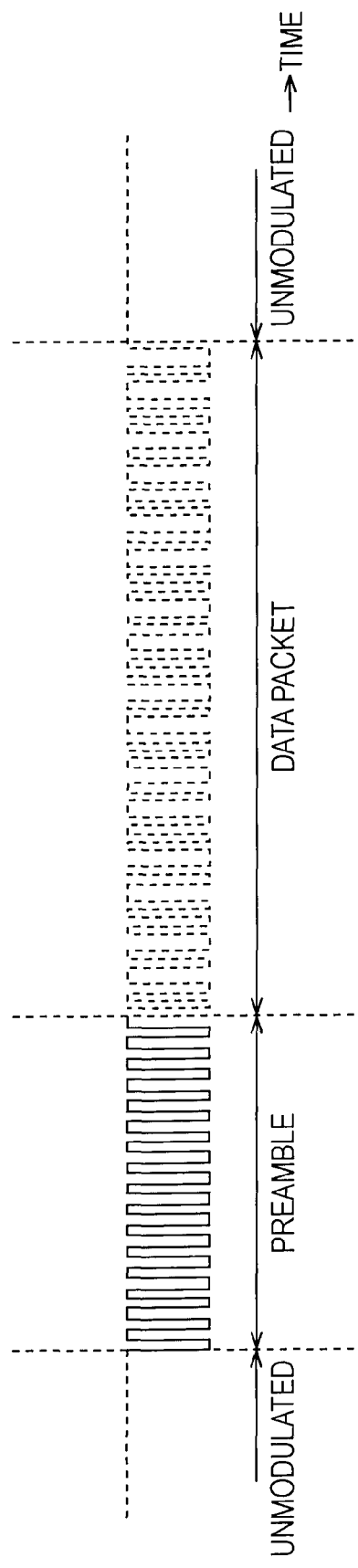
FIG. 5 is a waveform diagram showing the waveform of a frame.

FIG. 5 shows the waveform of an electromagnetic wave in a case where communication in passive mode is performed at a transfer rate of 212 kbps (kiro bit per second) or 424 kbps.

That is, in NFCIP-1, communication can be performed at a transfer rate selected from among a plurality of transfer rates, and FIG. 5 shows the waveform of an electromagnetic wave in a case where passive mode communication is performed at a transfer rate of 212 kbps or 424 kbps.

When starting communication in passive mode, the initiator performs the initial RFCA process, and starts outputting a carrier wave (unmodulated electromagnetic wave) with a frequency $f_c$. Thereafter, the initiator modulates the carrier wave with logical 0B (B indicates that the number preceding it is a binary number). As shown in FIG. 5, a modulated signal obtained by modulating the carrier wave with logical 0B (Manchester code obtained by encoding the logical 0B) is called a preamble. NFCIP-1 specifies that a preamble must be at least 48 bits long.

When modulation of a carrier wave is started, and further a target existing around the initiator receives a preamble that is at least 48 bits long, for example, the target recognizes that communication in passive mode will be started, and receives a modulated signal as data (data packet) transmitted subsequent to the preamble.

Here, a set of preamble and data packet following the preamble is called a frame. The beginning of a frame is recognized by a preamble. The end of a frame is recognized on the basis of length field information described later that is included in the frame.

Figure 6:
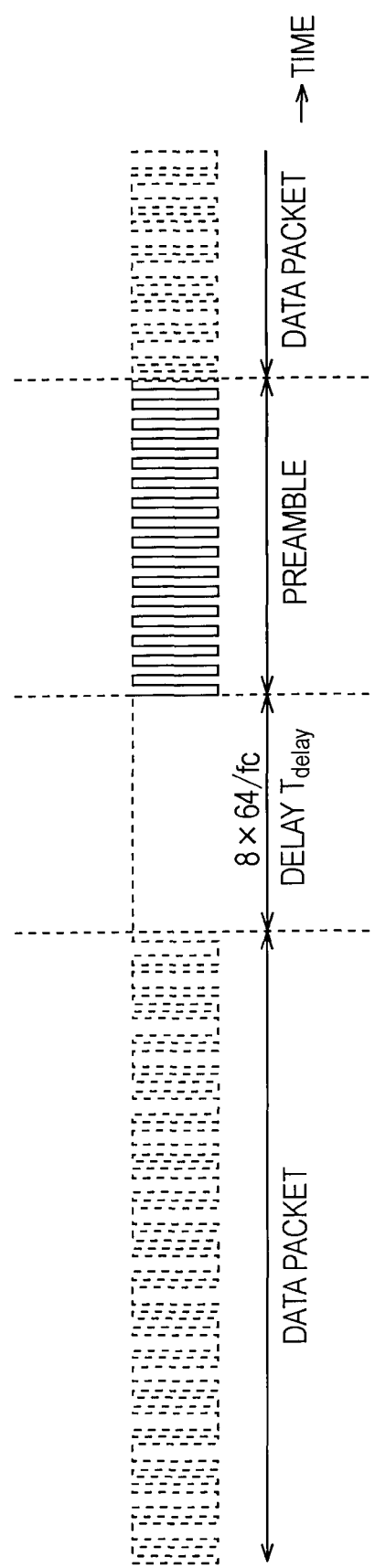
FIG. 6 is a waveform diagram illustrating an interval (delay time) between frames.

Next, FIG. 6 is a diagram illustrating a time interval (delay time) between two frames in a case where, after a frame is transmitted by a communication device as the initiator or target, another communication device transmits a frame.

According to NFCIP-1, when, after a given communication device transmits a frame, another communication device transmits a frame responding to that frame, for example, a time interval of at least $8 \times 64/f_c$ must be allowed.

That is, the time $T_{delay}$ between the end of a frame transmitted by a given communication device and the beginning of (the preamble of) the next frame must be at least $8 \times 64/f_c$ long.

In this case, since the frequency $f_c$ of a carrier wave is 13.56 MHz as described above, the time $8 \times 64/f$, equals approximately 0.038 ms.

Figure 7:
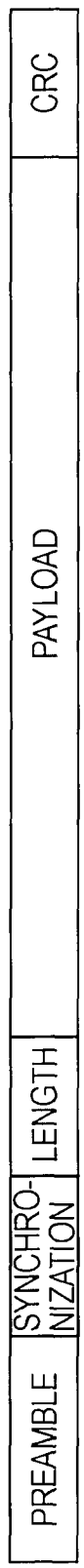
FIG. 7 is a diagram showing the format of a frame.

Next, FIG. 7 shows the format of a frame exchanged between the initiator and the target.

A frame includes a preamble field, a synchronization field, a length field, a payload field, and a CRC (Cycle Redundancy Checking) field that are sequentially arranged from its leading edge.

The preamble field has a size of 48 bits or more, and (logical) 0B is placed as a preamble in the preamble field.

The synchronizing field has a size of 2 bytes. The first byte is B2H (H indicates that a numeric value preceding it is a sexadecimal number), and the second byte is 4DH. That is, B24DH is placed as a synchronization pattern in the synchronization field.

The length field has a size of 8 bits. In the length field, a value equal to the byte count of data placed in the payload field plus 1 is set. It should be noted that the value set in the length field must be a value within the range of 2 to 255, and other values represented by 8 bits are reserved (secured) for future extension.

In the payload filed, payload (data) of a byte count equal to the value set in the length field minus 1 is placed (included).

In the CRC field, a 16-bit CRC code obtained in accordance with Appendix A.3 of ISO/IEC 18092 is placed.

Next, as described above with reference to FIG. 4, a communication device that is to become an initiator starts outputting an electromagnetic wave by the initial RFCA process, and thereafter transmits data (frame). The communication device that is to become an initiator becomes the initiator by starting output of an electromagnetic wave, and a communication device that exists at a position proximate to that initiator becomes a target.

Now, consider a case where a plurality of (communication devices that can become) targets exist around the initiator. In this case, there are times when each of the plurality of targets transmits a frame responding to a frame transmitted by the initiator. Accordingly, it is necessary for the initiator to identify, with respect to a frame transmitted as a response to a previously transmitted frame, which one of the plurality of targets has transmitted that frame. That is, it is necessary for the initiator to identify the target that has transmitted a frame as a response.

Accordingly, after starting outputting an electromagnetic wave by the initial RFCA process, the initiator makes a request for, for example, a NFCID (NFC Identification) determined by a random number or the like which serves as information for identifying each target, to one or more targets located in proximity to the initiator. Then, in response to the request from the initiator, the target located in proximity to the initiator transmits a NFCID for specifying itself to the initiator.

The initiator identifies the target on the basis of the NFCID transmitted from the target in this way, and designates the target as a communicating party on the basis of the NFCID to perform exchange of data.

In active mode communication, the initiator transmits a command (request) ATR_REQ described later including a NFCID for specifying itself. In reply to the ATR_REQ, one target returns (transmits) a response ATR_REQ described later, which includes a NFCID for specifying itself. The initiator and the target thus recognize each other's NFCIDs, thereby identifying (specifying) each other.

On the other hand, in passive mode communication at a transfer rate of 212 kbs or 424 kbps, the initiator acquires a NFCID that identifies a target existing around (at a position in proximity to) the target by performing the above-described SDD process.

In the SDD process, the initiator makes a request for the NFCID of the target. This request is made by the initiator transmitting a frame called a "polling request frame". Upon receiving the polling request frame, for example, the target determines its own NFCID by a random number, and transmits a frame called a "polling response frame" in which the NFCID is placed. The initiator recognizes the NFCID of the target by receiving the polling response frame transmitted from the target.

It should be noted that a NFCID used in the SDD process performed by passive mode communication at a transfer rate of 212 kbs or 424 kbps, in particular, is referred to as a "NFCID2". NFCIP-1 specifies that a NFCID2 must be an 8-byte numeric value, the leading 2 bytes of the 8-byte numeric value must be a prefix code, the prefix code must be one that defines the characteristics of 6 bytes following it, and that if the first byte of the prefix code is 01H and the second byte thereof is FEH, the subsequent 6 bytes must be random numbers. Further, prefix codes other than 01FEH are reserved for future extension.

When in passive mode, the target transmits a frame by performing load-modulation on the electromagnetic wave outputted by the initiator, so the RFCA process is not performed. Therefore, in the SDD process, when the initiator requests a target existing around the initiator for a NFCID (in a case where the initiator transmits a polling request frame requesting for a NFCID), if a plurality of targets exist around the initiator, two or more targets may simultaneously transmit their NFCIDs (polling request frames including NFCIDs). In this case, a collision occurs between the NFCIDs transmitted from the two or more targets, making it difficult for the initiator to recognize the collided NFCIDs.

In order to avoid such collision of NFCIDs as much as possible, the SDD process is performed by a method using, for example, time slots.

Figure 8:
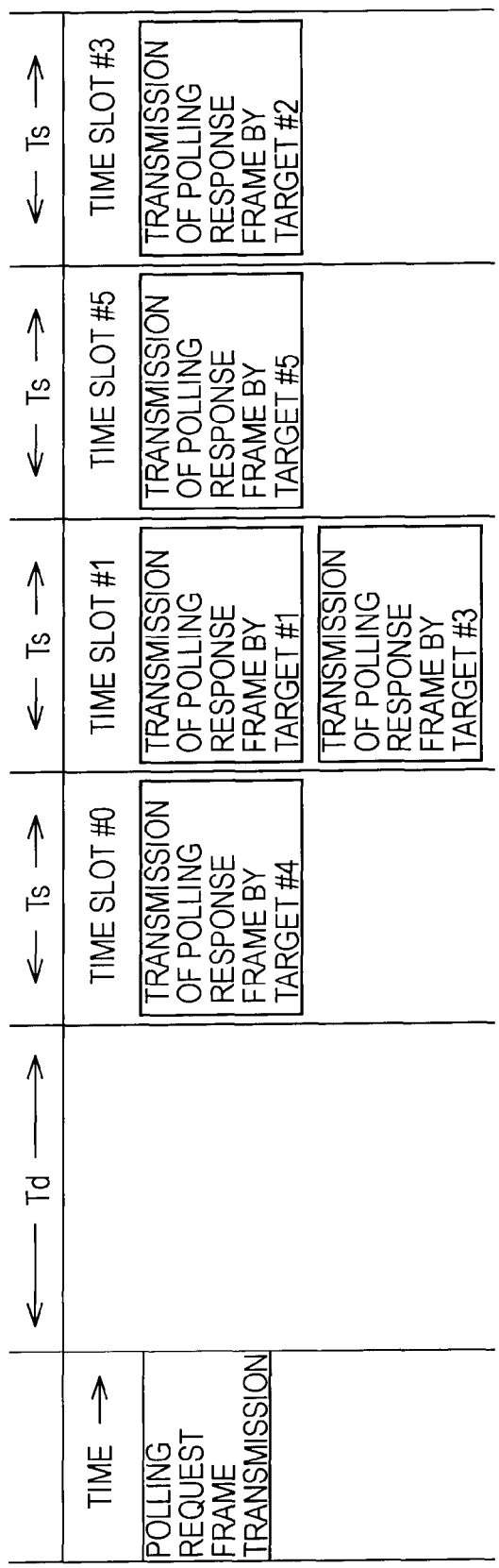
FIG. 8 is a diagram illustrating an SDD process.

FIG. 8 shows the sequence of the SDD process performed by a method using time slots. In FIG. 8, it is assumed that five targets #1, #2, #3, #4 and #5 exist around the initiator.

In the SDD process, the initiator transmits a polling request frame. After completion of the transmission, following an interval of a predetermined time $T_d$, a time slot having the width of a predetermined time $T_s$ is provided. The time $T_d$ is set to, for example, $512 \times 64/f_c$, that is, approximately 2.4 ms, and the time $T_s$ representing the width of a time slot is set to, for example, $256 \times 64/f_c$, that is, approximately 1.2 ms. The time slots are specified by sequential numbers (integers) assigned thereto that run from 0 beginning with the most preceding one.

Although FIG. 8 shows four time slots #0, #1, #2 and #3, in NFCIP-1, up to 16 time slots can be provided. The number of time slots provided with respect to a certain polling request frame is designated by the initiator, and a value equal to the number of time slots minus 1 is included in the polling request frame as time slot information TSN related to time slots, and transmitted to the target. FIG. 8 shows four time slots #0, #1, #2 and #3, thus illustrating time slots in a case where the time slot information TSN indicates 3.

The target receives a polling request frame transmitted from the initiator, and recognizes the time slot information TSN placed in the polling request frame. The target further generates an integer R within the range of 0 to TSN by using a random number, and transmits a polling response frame that includes its own NFCID at the timing of a time slot #R specified by the integer R.

As described above, the target determines a time slot, which represents the timing for transmitting a polling response frame, by using a random number. This means that the timings at which a plurality of targets transmit polling response frames vary, thus making it possible to minimize the chances of collision between the polling response frames transmitted from the plurality of targets.

Even if each target determines a time slot, which represents the timing for transmitting a polling response frame, by using a random number, there are times when the time slots in which a plurality of targets transmit polling response frames coincide with each other, resulting in the collision of polling response frames. In the embodiment shown in FIG. 8, the polling response frame of the target #4 is transmitted in the time slot #0, the polling response frames of the targets #1 and #3 are transmitted in the time slot #1, the polling response frame of the target #5 is transmitted in the time slot #2, and the polling response frame of the target #2 is transmitted in the time slot #3. The polling response frames of the targets #1 and #3 collide with each other.

In this case, the initiator cannot properly receive the polling response frames of the targets #1 and #3 that collide with each other. Accordingly, the initiator transmits a polling request frame again, thereby making it possible to request the targets #1 and #3 to transmit polling response frames with their respective NFCIDs placed therein. Thereafter, the transmission of a polling request frame by the initiator and the transmission of polling response frames by the targets can be repeated until the initiator recognizes the NFCIDs of all of the targets #1 to #5 located around the initiator.

If all the targets #1 to #5 return polling response frames when the initiator transmits a polling request frame again, a collision may occur again between polling response frames. To avoid this, if a target receives a polling request frame from the initiator and then receives another polling request frame again after only a relatively short interval of time, the target may ignore that polling request frame. In this case, however, according to the embodiment shown in FIG. 8, with respect to the targets #1 or #3 whose polling responses made to the first transmitted polling request frame collide with each other, the NFCIDs of the targets #1 and #3 cannot be recognized by the initiator. Therefore, the initiator cannot perform data exchange with the target #1 or #3.

Accordingly, the targets #2, #4, and #5 whose polling response frames have been properly received and whose NFCIDs have been thus successfully recognized by the initiator are temporarily removed (placed in a deselected state) from the target communication parties, thereby making these targets not to return polling response frames in response to a polling request frame. In this case, only the targets #1 and #3 whose NFCIDs could not be recognized at the transmission of the first polling request frame will return their polling response frames in response to the polling request frame retransmitted by the initiator. Therefore, in this case, it is possible to recognize the NFCIDs of all the targets #1 to #5 while minimizing the possibility of collision between polling response frames.

As previously discussed, upon receiving a polling request frame, the target determines (generates) its own NFCID using a random number. Therefore, cases may arise, although rarely, where the same NFCID is included in the polling response frames transmitted from different targets to the initiator. If the initiator receives polling response frames including the same NFCID in different time slots, the initiator can retransmit a polling request frame, in the same manner as in the case where collision occurs between polling response frames.

NFCIP-1 specifies as follows with regard to the operation of a target that has received a polling request frame including the time slot information TSN in the SDD process.

[1] The target must generate a random number R within the range of 0 to TSN.

[2] The target must wait until the timing of a time slot #R specified by a random number R is reached, and at the timing of that time slot #R, return a polling response frame and wait for the next command (request). The target may ignore a polling request frame in order to reduce collision of polling response frames.

Further, NFCIP-1 specifies as follows with regard to the processing of the initiator and target in the SDD process.

[1] The target draws electric power from a RF field generated by the initiator (electromagnetic wave generated by the initiator).

[2] The target must complete the preparations for receiving a polling request frame from the initiator within 2 seconds at the longest after activation.

[3] The target must wait for a polling request frame transmitted from the initiator. The initiator may transmit the polling request frame without regard to the convenience (state) of the target.

[4] If the initiator has failed in receiving a polling response frame, the initiator may transmit a polling request frame again. When in passive mode, the initiator must maintain the RF power-ON state (state in which an electromagnetic wave is being outputted) while the SDD process is executed.

Next, FIG. 9 shows the format of a polling request frame.

Like the frame shown in FIG. 7, a polling request frame includes a preamble field, a synchronization field, a length field, a payload field, and a CRC field that are sequentially arranged from its leading edge.

As described above with reference to FIG. 7, in the preamble field, 0B of 48 bits or more is placed as a preamble, and a 2-byte synchronization pattern of B24DH is placed in the synchronizing field. Further, in the CRC field, a CRC code obtained in accordance with Appendix A.3 of ISO/IEC 18092 is placed.

In the length field, as described above with reference to FIG. 7, a value equal to the byte count of the payload field plus 1 is set. The payload field of a polling request frame has a size of 5 bytes. Therefore, a value equal to 5 bytes plus 1, 06H, is set in the length field.

As described above, the payload field of a polling request frame has a size of 5 bytes, and 00H, FFH, FFH, 00H, and time slot information TSN of 1 byte are sequentially set from its leading byte. The leading byte 00H in the payload field indicates that this frame is a polling request frame.

It should be noted that with respect to the second and third bytes in the payload field, values other than FFH are reserved for future extension. Likewise, with respect to the fourth byte as well, values other than 00H are reserved for future extension.

NFCIP-1 specifies that the time slot information TSN of 1 byte must have one of the values 00H, 01H, 03H, 07H, 0FH, and other values are reserved for future extension.

Next, FIG. 10 shows the format of a polling request frame.

Like the frame shown in FIG. 7, a polling request frame includes a preamble field, a synchronization field, a length field, a payload field, and a CRC field that are sequentially arranged from its leading edge.

As described above with reference to FIG. 7, in the preamble field, 0B of 48 bits or more is placed as a preamble, and a 2-byte synchronization pattern of B24DH is placed in the synchronizing field. Further, in the CRC field, a CRC code obtained in accordance with Appendix A.3 of ISO/IEC 18092 is placed.

In the length field, as described above with reference to FIG. 7, a value equal to the byte count of the payload field plus 1 is set. The payload field of a polling request frame has a size of 17 (=11H) bytes. Therefore, a value equal to 11H bytes plus 1, 12H, is set in the length field.

As described above, the payload field of a polling request frame has a size of 17 bytes, and 01H, NFCID2 of 8 bytes, and Pad of 8 bytes are sequentially set from its leading byte. The leading byte 01H in the payload field indicates that this frame is a polling response frame.

It should be noted that the Pad of 8 bytes in the payload field of a polling response frame represents, for example, data for so-called padding, and NFCIP-1 specifies that the Pad of 8 bytes must be ignored as data interchange.

Next, NFCIP-1 defines a command (request) of the transport protocol, and a response to the command.

FIG. 11 shows a command of the transport protocol and a response defined by NFCIP-1.

Referring to FIG. 11, characters REQ described after an under bar (_) represents a command (request), and characters RES described after the under bar (_) represents a response. According to the embodiment shown in FIG. 11, as the command, there are six kinds of command ATR_REQ, WUP_REQ, PSL_REQ, DEP_REQ, DSL_REQ, and RLS_REQ. Likewise, as for the response to the command, there are six kinds of response ATR_RES, WUP_RES, PSL_RES, DEP_RES, DSL_RES, and RLS_RES. The initiator transmits a command (request) to the target, and the target transmits to the initiator a response to the command from the initiator.

A command ATR_REQ is transmitted to the target when the initiator informs the target of its own attributes (specifications) and requests the target for the target's attributes. In this case, attributes of an initiator or target include the transfer rate of data that can be transmitted and received by the initiator or target, communication parameters related to communication such as the modulation scheme in which data is modulated, and the like. It should be noted that the command ATR_REQ includes, in addition to the attributes of an initiator, a NFCID for specifying the initiator, or the like. By receiving the command ATR_REQ, the target recognizes the attributes and NFCID of the initiator.

When the target receives the command ATR_REQ, a response ATR_RES is transmitted to the initiator as a response to the command ATR_REQ. In the response ATR_RES, the attributes, NFCID, and the like of the target are placed (included).

It should be noted that information on the transfer rate, for example, as an attribute to be placed in the command ATR_REQ or the response ATR_RES can include all the transfer rates at which data can be transmitted and received by the initiator or the target. In this case, by means of a single exchange of the command ATR_REQ and the response ATR_RES between the initiator and the target, the initiator can recognize all the transfer rates at which data can be transmitted and received by the target, and the target can also recognize all the transfer rates at which data can be transmitted and received by the initiator.

A command WUP_REQ is transmitted when the initiator selects the target with which the initiator is to communicate. That is, by transmitting a command DSL_REQ described later from the initiator to the target, the target can be placed into a deselected state (state in which transmission of data (response) to the initiator is prohibited). The command WUP_REQ is transmitted when releasing this deselected state to make the target be able to transmit data to the initiator. It should be noted that the command WUP_REQ has the NFCID of the target whose deselected state is to be released. Of the targets that have received the command WUP_REQ, the target specified by the NFCID placed in that command WUP_REQ is released from the deselected state.

A response WUP_RES is transmitted as a response to the command WUP_REQ when, of the targets that have received the command WUP_REQ, the target specified by the NFCID placed in the command WUP_REQ has been released from the deselected state.

It should be noted that the command WUP_REQ is transmitted only when the initiator is in the active mode, and the response WUP_RES is transmitted only when the target is in the active mode.

A command PSL_REQ is transmitted when the initiator changes a communication parameter related to the communication with the target. In this case, examples of communication parameter include the transfer rate of data exchanged between the initiator and the target, and the modulation scheme.

The command PSL_REQ includes the value of a communication parameter that has been changed, and is transmitted from the initiator to the target. The target receives the command PSL_REQ, and changes a communication parameter in accordance with the value of the communication parameter placed in the command. Further, the target transmits a response PSL_RES to the command PSL_REQ.

A command DEP_REQ is transmitted when the initiator performs transmission and reception of data (so-called real data) (data exchange with the target). In the command, the real data to be transmitted to the target or the like is placed. A response DEP_RES is transmitted by the target as a response to the command DEP_REQ. In the response, the real data to be transmitted to the initiator is placed. Therefore, by the command DEP_REQ, real data is transmitted from the initiator to the target, and by the response DEP_RES to the command DEP_REQ, real data is transmitted from the target to the initiator.

A command DSL_REQ is transmitted by the initiator when placing the target into the deselected state (deactivating the target). The target that has received the command DSL_REQ transmits a response DSL_RES to the command DSL_REQ and enters the deselected state. Thereafter, the target does not respond to a command other than the command WUP_REQ (that is, does not return a response).

A command RLS_REQ is transmitted when the initiator completely ends communication with the target. The target that has received the command RLS_REQ transmits a response RLS_RES in reply to the command RLS_REQ, and completely ends communication with the initiator.

The commands DSL_REQ and RLS_REQ are common in that they exclude (remove) a target from the target communication parties with the initiator. However, although the target excluded by the command DSL_REQ becomes able to communicate with the initiator again by the command WUP_REQ, the target excluded by the command RLS_REQ does not become able to communicate with the initiator unless the initiator starts the process again from the initial RFCA process. The commands DSL_REQ and RLS_REQ differ in this respect.

Next, referring to the flowchart in FIG. 12, a description will be given of an overview of communication in passive mode according to NFCIP-1.

First, in step S1, a communication device that serves as the initiator performs an initial RFCA process, and the process proceeds to step S2. In step S2, the communication device that serves as the initiator determines whether or not a RF field has been detected by the initial RFCA process in step S1. If it is determined in step S2 that a RF field has been detected, the process returns to step S1, and the same process is repeated thereafter. That is, while a RF field is being detected, the communication device that serves as the initiator does not form a RF field so as to avoid interference with the communication being performed by another communication device that is forming that RF field.

On the other hand, if it is determined in step S2 that no RF field has been detected, the process proceeds to step S3, where the communication device selects the passive mode as the communication mode. Further, in step S3, the communication device becomes the initiator and performs selection of a transfer rate or the like.

In NFCIP-1, it is possible to select the transfer rate actually used for communication from among a plurality of transfer rates, for example, 212 kbps and 424 kbps. Thus, in step S3, the communication device that has become the initiator selects a transfer rate. It should be noted that which one of the plurality of transfer rates is to be selected in step S3 can be set in advance, for example.

In step S3, the communication device as the initiator further performs predetermined initialization processing and SDD processing, and the process proceeds to step S4.

In step S4, the initiator is activated (started) in the passive mode, and exchanges the command ATR_REQ and the response ATR_RES with the target that is in the passive mode. The process then proceeds to step S5.

In step S5, in a case where the initiator needs to change a communication parameter necessary for communication (for example, the transfer rate) from the current communication parameter, the initiator selects the communication parameter, and exchanges the command PSL_REQ and the response PSL_RES including the communication parameter or the like with the target to change the communication parameter, and the process proceeds to step S6.

In step S6, the initiator performs data exchange (communication) based on a data exchange protocol for exchanging the command DEP_REQ and the response DEP_RES with the target in accordance with the communication parameter selected in step S5, and after the data exchange is finished, the process proceeds to step S7. In step S7, the initiator exchanges the command RSL_REQ and the response RSL_RES with the target and is deactivated, ending the transaction.

Figure 12:
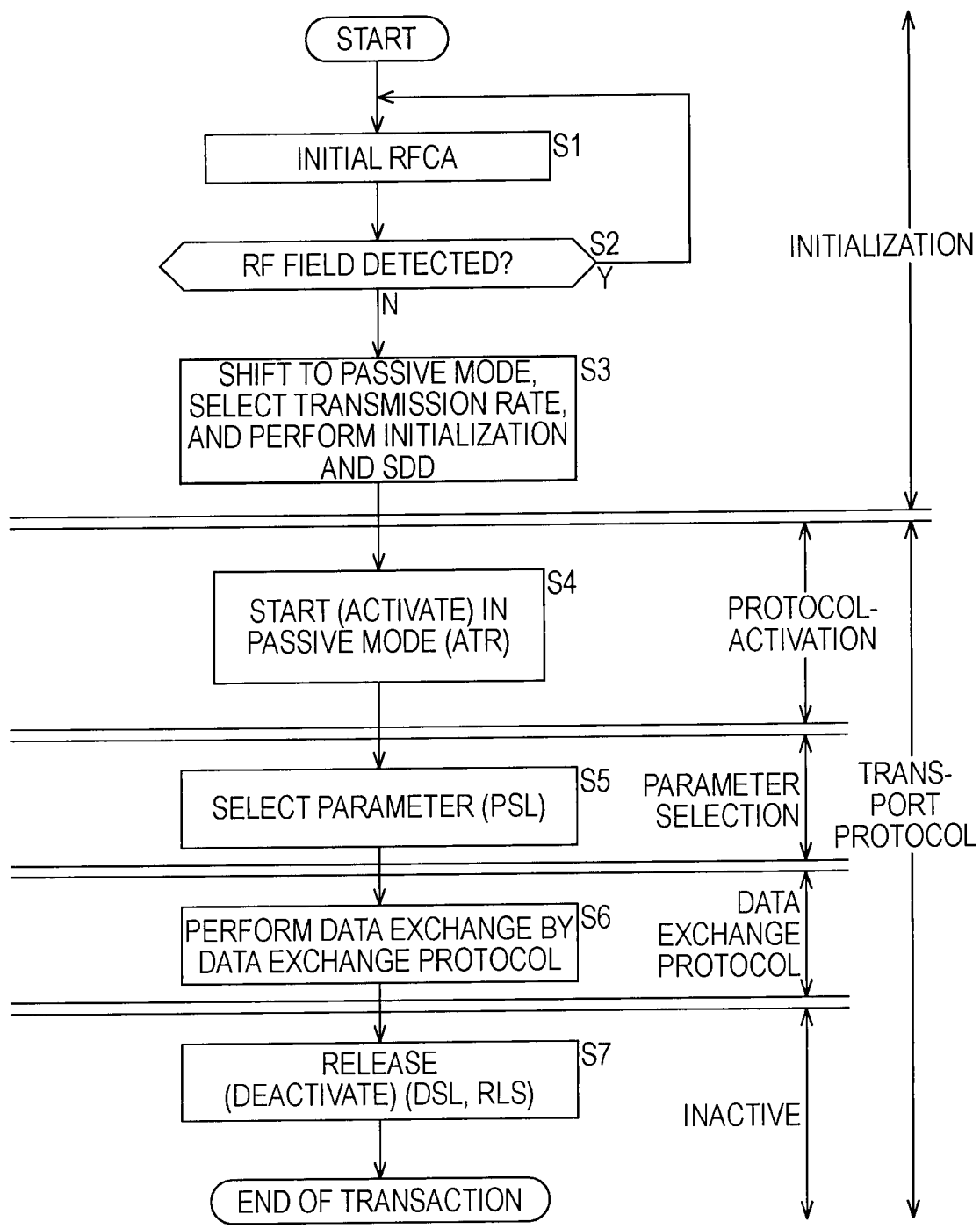
FIG. 12 is a flowchart illustrating an overview of a communication process in passive mode.

While communication in passive mode is performed in FIG. 12, it is also possible to perform communication in active mode. When performing communication in active mode, in step S3, the initiator selects the active mode as the communication mode, and further selects a transfer rate or the like. Then, the process proceeds to step S4, where the initiator is activated in the active mode, exchanges the command ATR_REQ and the response ATR_RES with the target, and the process proceeds to step S5. Thereafter, communication is performed by roughly the same procedure as that in the passive mode.

In this case, a communication device can become the initiator in response to a request from an application, for example. Further, in response to the request from the application, the communication device can, for example, select which one of the active mode and the passive mode is to be adopted as the communication mode, and select (determine) the transfer rate.

As described above, the initiator forms a RF field if no external RF field is formed, and the target is activated by the RF field formed by the initiator. Then, the initiator transmits a command on the basis of the selected communication mode and transfer rate, and the target returns (transmits) a response in the same communication mode and at the same transfer rate as those of the initiator.

Further, instead of implementing both the functions of the initiator and target on the communication device, only either of these functions can be implemented on the communication device. Further, instead of implementing both the communication modes of the passive mode and active mode on the communication device, only either one of these communication mode can be executed.

Next, referring to the flow chart in FIG. 13, a description will be given of the processing of an activation protocol in the passive mode (processing performed by the communication device to exchange data in the passive mode).

First, in step S11, the initiator performs an initial RFCA process, and the process proceeds to step S12, where the communication mode is set to the passive mode. Then, the process proceeds to step S13, where the initiator performs an initialization process and an SDD process to select a transfer rate.

In this case, the processing of step S11 corresponds to the processing of steps S1 and S2 in FIG. 12, and the processing of steps S12 and S13 corresponds to the processing of step S3 in FIG. 12.

Thereafter, the process proceeds to step S14, where the initiator determines whether or not a request for attributes is to be made to the target. Here, the term attributes refers to information on the specifications of a communication device, examples of which include the transfer rate that can be handled by the communication device, the modulation scheme, and other such communication parameters related to communication.

If it is determined in step S14 that a request for attributes is not to be made to the target, the process proceeds to step S15, where the initiator performs communication with the target in accordance with its unique protocol. Then, the process returns to step S13 and subsequently, similar processing is repeated.

If it is determined in step S14 that a request for attributes is to be made to the target, the process proceeds to step S16, where the initiator transmits a command ATR_REQ, thereby making a request for attributes to the target. Then, the initiator waits for a response ATR_RES to the command ATR_REQ to be transmitted from the target, and the process proceeds to step S17, where the response ATR_RES is received. Then, the process proceeds to step S18.

In this case, the processing of steps S16 and S17 corresponds to the processing of step S4 in FIG. 12.

In step S18, on the basis of the response ATR_RES received from the target in step S17, the initiator determines whether or not the communication parameter, that is, for example, a transfer rate, can be changed. If it is determined in step S18 that the transfer rate cannot be changed, that is, for example, when there are no transfer rates other than the current transfer rate which can be handled by both the initiator and the target, steps S19 to S21 are skipped, and the process proceeds to step S22.

If it is determined in step S18 that the transfer rate can be changed, that is, for example, when there are transfer rates other than the current transfer rate which can be handled by both the initiator and the target, and the transfer rate used for communication can be changed from the current transfer rate to a higher transfer rate or a lower transfer rate for the purpose of achieving faster communication or enhanced noise resistance, the process proceeds to step S19, where the initiator transmits a command PSL_REQ, thereby requesting the target to change the transfer rate. Then, the initiator waits for a response PSL_RES to the command PSL_REQ to be transmitted from the target, and the process proceeds from step S19 to step S20, where the response PSL_RES is received. Then, the process proceeds to step S21. In step S21, the initiator changes the communication parameter, that is, for example, the transfer rate or the like in accordance with the response PSL_RES received in step S20, and the process proceeds to step S22.

In this case, the processing of steps S18 to S21 corresponds to the processing of step S5 in FIG. 12.

In step S22, the initiator performs data exchange, that is, exchange of the command DEP_REQ and the response DEP_RES, with the target in accordance with a data exchange protocol.

In this case, the processing of step S22 corresponds to the processing of step S6 in FIG. 12.

After data conversion is performed in step S22, the initiator proceeds to step S23 or S25 as necessary.

That is, when the initiator places the target into a deselected state, the process proceeds from step S22 to step S23, and the initiator transmits a command DSL_REQ. Then, the initiator waits for a response DSL_RES to the command DSL_REQ to be transmitted from the target and proceeds from step S23 to step S24, where the response DSL_RES is received. The process then returns to step S13 and subsequently, similar processing is repeated.

On the other hand, when the initiator completely ends the communication with the target, the process proceeds from step S22 to step S25, where a command RLS_REQ is transmitted. Then, the initiator waits for a response RLS_RES to the command RLS_REQ to be transmitted from the target, and the process then proceeds from step S25 to step S26, where the response RLS_RES is received. Then, the process returns to step S11 and subsequently, similar processing is repeated.

In this case, the processing of steps S23 and S24 and the processing of steps S25 and S26 correspond to the processing of step S7 in FIG. 12.

As described above, in passive mode communication according to NFCIP-1, the SDD process described above with reference to FIG. 8 is performed.

That is, in the SDD process, a communication device as the initiator transmits a polling request frame (FIG. 9) as a command including time slot information TSN related to time slots. Further, a communication device as the target receives the polling request frame from the initiator, and on the basis of the time slot information TSN included in the polling request frame, determines the time slot for transmitting a polling response frame in reply to that polling request frame by a random number R. At the timing of that time slot #R, the communication device transmits a polling response frame (FIG. 10) including a NFCID (NFCID2) that identifies the target. Then, the initiator receives the polling response frame from the target, and thus acquires the NFCID of the target and identifies the target on the basis of the NFCID.

After the SDD process described above is finished, data exchange of real data is performed between the initiator and the target by using request and response frames of a data exchange protocol, that is, the command DEP_REQ and the response DEP_RES in FIG. 11.

The data exchange protocol refers to a method (protocol) for establishing a connection by using the NFCID2, and carrying out data exchange with a specific party. The NFCIP-1 also provides for a frame retransmission procedure.

As described above, in passive mode communication, by taking situations where a plurality of targets exist around the initiator into consideration, an SDD process using time slots is performed to identify the plurality of targets, and then exchange of real data is performed between the initiator and the target.

Therefore, in passive mode communication according to NFCIP-1, the SDD process is always performed even when NFCIP-1 is applied to, for example, an application which assumes the presence of only one target that communicates with the initiator, and then exchange of real data is performed between the initiator and the target. Accordingly, in passive mode communication according to NFCIP-1, up to a certain amount of communication time is required even when, for example, only a small amount of data is transmitted from the target to the initiator.

Figure 14:
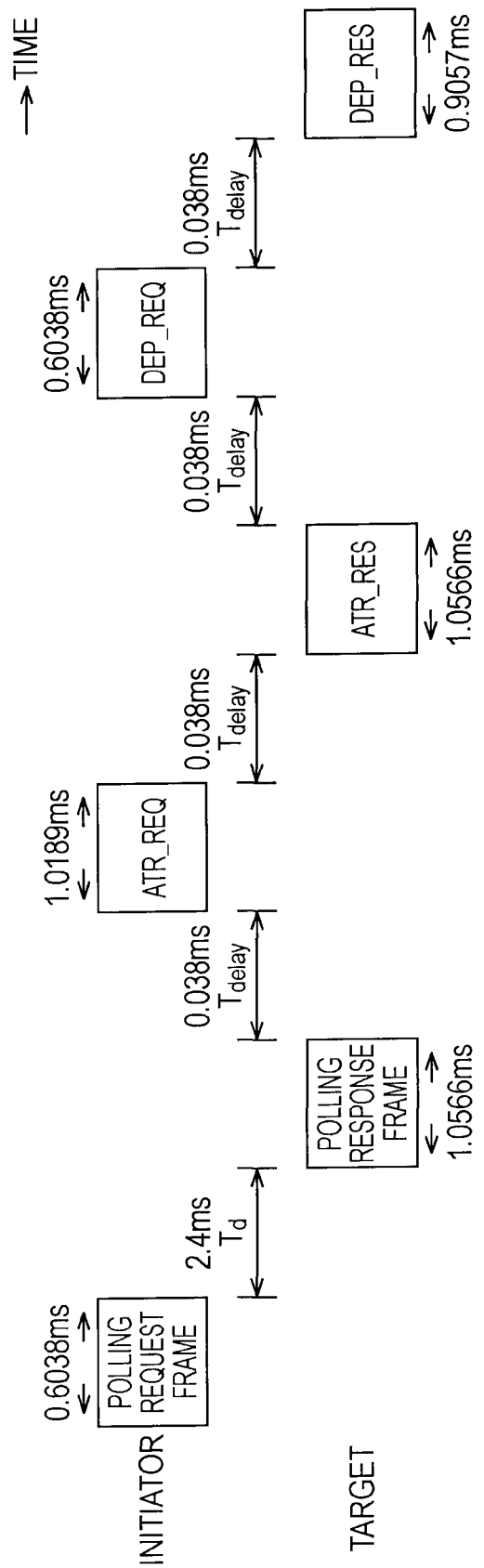
FIG. 14 is a diagram illustrating the communication time required for transmitting real data by communication in passive mode.

FIG. 14 shows the communication time required for transmitting real data from the target to the initiator by passive mode communication according to NFCIP-1.

It is assumed that communication in passive mode is performed between the initiator and the target at a transfer rate of, for example, 212 kbps.

As described above, in passive mode communication, an SDD process is performed first.

In the SDD process, first, the initiator transmits the polling request frame shown in FIG. 9. The size of the polling request frame becomes minimum when the preamble field is 48 bits long. That is, as shown in FIG. 9, a polling request frame includes a preamble field of 48 bits (6 bytes) or more, a synchronization field of 16 bits (2 bytes), a length field of 8 bits (1 byte), a payload field of 5 bytes, and a CRC field of 16 bits (2 bytes). Accordingly, when the preamble field is 48 bits long, the size of the polling request frame becomes minimum at 16 bytes. The time required for transmitting a polling request frame of this minimum size, 16 bytes, at a transfer rate of 212 kbps is approximately 0.6038 ms (=16 bytes×8 bits/212 kbps).

As described above with reference to FIG. 8, in the SDD process, after the initiator transmits a polling request frame, following an interval of $512 \times 64/f_c$ as the predetermined time $T_d$, that is, approximately 2.4 ms, a time slot whose width (time) $T_s$ is $256 \times 64/f_c$ seconds, that is, approximately 1.2 ms, is provided.

Now, consider a case where the target transmits, at the timing of the first time slot #0, a polling response frame in reply to a polling request frame from the initiator. In this case, after the transmission of the polling request frame by the initiator is finished, following an interval of approximately 2.4 ms as the predetermined time $T_d$, transmission of the polling response frame by the target is started.

Like the size of a polling request frame, the size of a polling response frame becomes minimum when the preamble field is 48 bits long. That is, as shown in FIG. 10, a polling request frame includes a preamble field of 48 bits (6 bytes) or more, a synchronization field of 16 bits (2 bytes), a length field of 8 bits (1 byte), a payload field of 17 bytes, and a CRC field of 16 bits (2 bytes). Accordingly, when the preamble field is 48 bits long, the size of the polling request frame becomes minimum at 28 bytes. The time required for transmitting a polling request frame of this minimum size, 28 bytes, at a transfer rate of 212 kbps is approximately 1.05668 ms (=28 bytes×8 bits/212 kbps).

In this way, a polling request frame and a polling response frame are exchanged between the initiator and the target, and the initiator acquires the NFCID2 of the target, which is included in the polling request frame from the target, thus ending the SDD process.

Figure 13:
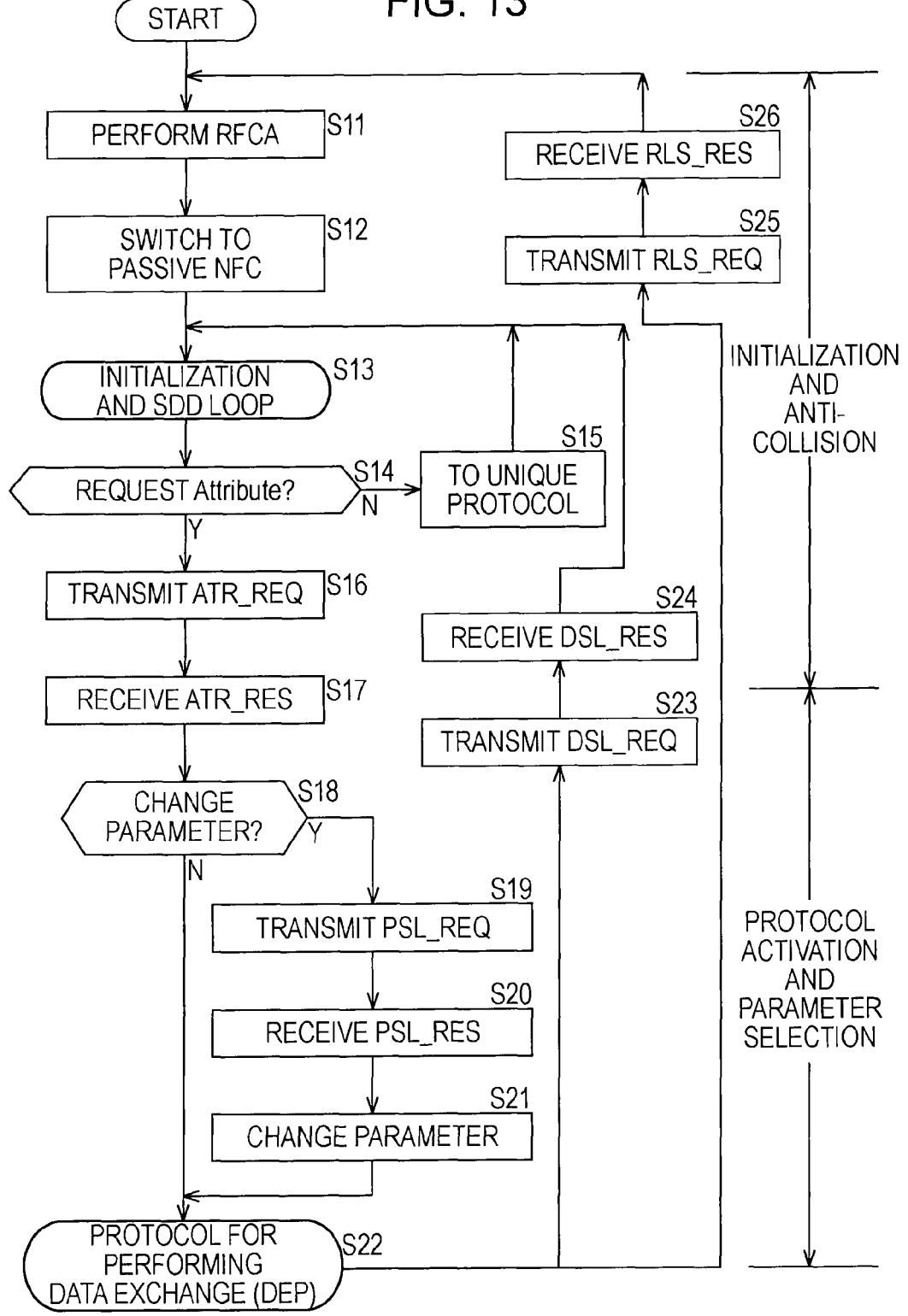
FIG. 13 is a flowchart illustrating a communication process performed in a passive mode.

Now, consider a case where exchange of the command ATR_REQ and the response ATR_RES (steps S16 and S17) shown in FIG. 13 is performed between the initiator and the target, and thereafter, exchange of one set of command DEP_REQ and response DEP_RES (step S22) is performed so that, for example, real data of 8 bytes is transmitted from the target to the initiator by the response DEP_RES. In this case, as described above with reference to FIG. 6, the interval of the time $T_{delay}$, that is, $256 \times 64/f_c$ seconds or approximately 0.038 ms must be allowed between frames. Accordingly, the initiator transmits the command ATR_REQ upon elapse of the time $T_{delay}$ after the transmission of a polling request frame by the target is finished.

In this case, according to NFCIP-1, the size of the frame of the command ATR_REQ becomes minimum at 27 bytes when the preamble field is 48 bits long, and data called general bytes that can be included in the payload field (FIG. 7) of that frame is 0 bytes long.

Assuming that (the frame of) the command ATR_REQ of this minimum size, 27 bytes, is to be transmitted from the initiator to the target at a transfer rate of 212 kbps, the time required for the transmission is approximately 1.10189 ms (=27 bytes×8 bits/212 kbps).

The target receives the command ATR_REQ from the initiator, and after waiting for the time $T_{delay}$ (=$8 \times 64/f_c$=approximately 0.038 ms), transmits the response ATR_RES to the command ATR_REQ to the initiator.

In this case, according to NFCIP-1, the size of the frame of the response ATR_RES becomes minimum at 28 bytes when the preamble field is 48 bits long, and data called general bytes that can be included in the payload field (FIG. 7) of that frame is 0 bytes long.

Assuming that (the frame of) the response ATR_RES of this minimum size, 28 bytes, is to be transmitted from the target to the initiator at a transfer rate of 212 kbps, the time required for the transmission is approximately 1.0566 ms (=28 bytes×8 bits/212 kbps).

The initiator receives the response ATR_RES from the target, and after waiting for the time $T_{delay}$ (=approximately 0.038 ms), transmits the command DEP_REQ of a data exchange protocol to the target.

In this case, according to NFCIP-1, the size of the frame of the command DEP_REQ becomes minimum at 16 bytes when the preamble field is 48 bits long, and data called user data bytes that can be included in the payload field (FIG. 7) of that frame is 0 bytes long.

Assuming that (the frame of) the command DEP_REQ of this minimum size, 16 bytes, is to be transmitted from the initiator to the target at a transfer rate of 212 kbps, the time required for the transmission is approximately 0.6038 ms (=16 bytes×8 bits/212 kbps).

The target receives the command DEP_REQ from the initiator, and after waiting for the time $T_{delay}$ (=approximately 0.038 ms), transmits the response DEP_RES to the command DEP_REQ to the initiator.

At this time, as described above, in a case where the target transmits real data of 8 bytes to the initiator by the response DEP_RES, according to NFCIP-1, the real data of 8 bytes is included as user data bytes in the payload field (FIG. 7) of the response DEP_RES. Further, the size of the frame of the response DEP_RES including the rear data of 8 bytes as user data bytes in this way becomes minimum at 24 bytes when the preamble field is 48 bits long.

Assuming that (the frame of) the response DEP_RES of this minimum size, 24 bytes, is to be transmitted from the target to the initiator at a transfer rate of 212 kbps, the time required for the transmission is approximately 0.9057 ms (=24 bytes×8 bits/212 kbps).

The initiator receives the response DEP_RES from the target, thereby acquiring the real data of 8 bytes included in the response DEP_RES.

Therefore, according to passive mode communication, a communication time of at least approximately 7.794 ms (=0.6038 ms+2.4 ms+1.0566 ms+0.038 ms+1.0189 ms+0.038 ms+1.0566 ms+0.038 ms+0.06038 ms+0.038 ms+0.9057 ms) is required for performing data exchange of the real data of 8 bytes.

Next, as described above, in passive mode communication, by taking situations where a plurality of targets exist around the initiator into consideration, an SDD process using time slots is performed to identify the plurality of targets, thereby identifying (discriminating between) the targets existing around the initiator.

Therefore, in passive mode communication according to NFCIP-1, the SDD process is always performed even when NFCIP-1 is applied to, for example, an application which assumes the presence of only one target that communicates with the initiator, and then exchange of real data by a data exchange protocol (through exchange of the command DEP_REQ and the response DEP_RES) between the initiator and the target is performed.

In a case where an application to which NFCIP-1 is applied assumes that the initiator communicates with only one target, the initiator never communicates with a plurality of targets (simultaneously), that is, there is always only one target that becomes a target communication party with the initiator. Therefore, it is not necessary for the initiator to identify the target as a target communication party since there is only one such target. In addition, the problem of collision, whereby responses are transmitted simultaneously from a plurality of targets, does not occur.

Examples of an application which assumes that the initiator communicates with only one target include one in which a R/W as the initiator is installed at the gate for entry to an attraction in an amusement park, an IC card as a target, which functions as a passport (ticket) for using the attraction, is issued to the user, and the validity of the passport is checked at the gate.

That is, in the amusement park, an IC card storing information on the passport expiration date is issued to the user, and at the gate that allows entrance of one person at a time, the user holds the IC card over the R/W. In this case, real data indicating the expiration date stored in the IC card is transmitted from the IC card to the R/W, and the expiration date indicated by the real data is checked by the R/W.

In the case of an application which assumes that the initiator communicates with only one target as described above, there is no need to identify a target in the SDD process. Accordingly, provided that exchange of real data is performed by using the sequence of the SDD process as it is, the data exchange can be performed in the following manner, for example.

That is, as described above, although the current NFCIP-1 specifies that the Pad of 8 bytes in the payload field of the polling response frame in FIG. 10 must be ignored, a case is now considered where data exchange of real data is performed by using this Pad.

In this case, the exchange of real data of 8 bytes described above with reference to FIG. 14 can be performed as follows.

Figure 15:
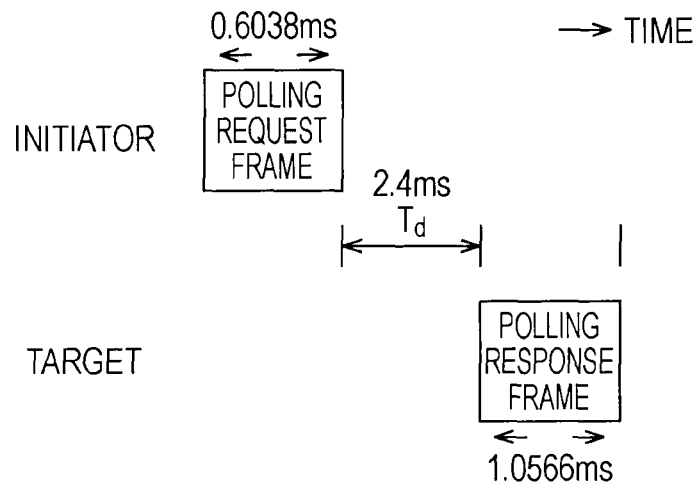
FIG. 15 is a diagram illustrating the communication time required in a case where real data is transmitted by a polling response frame, by using the sequence of an SDD process.

FIG. 15 shows the communication time required when real data of 8 bytes is transmitted from the target to the initiator by the Pad of the polling response frame (FIG. 10), by using the sequence of the SDD process as it is.

It is assumed that as in FIG. 14, communication is performed between the initiator and the target at a transfer rate of 212 kbps in FIG. 15 as well.

In FIG. 15, as in the SDD process in FIG. 14, the initiator transmits the polling request frame shown in FIG. 9. Provided that the size of this polling request frame is the minimum size of 16 bytes as described above with reference to FIG. 14, the time required for transmitting the polling request frame having this minimum size of 16 bytes at a transfer rate of 212 kbps is approximately 0.6038 ms (–16 bytes×8 bits/212 kbps).

As described above with reference to FIG. 14, after the initiator transmits a polling request frame, following an interval of approximately 2.4 ms as the predetermined time $T_d$, a time slot whose width (time) $T_s$ is approximately 1.2 ms is provided.

In FIG. 15, assuming that, as in FIG. 14, the target transmits a polling response frame in reply to a polling request frame from the initiator at the timing of the first time slot #0, after the transmission of the polling request frame by the initiator is finished, following an interval of approximately 2.4 ms as the predetermined time $T_d$, transmission of the polling response frame by the target is started.

It should be noted, however, that in FIG. 15, the target places real data as the Pad of 8 bytes in the payload field of the polling response frame (FIG. 10).

As described above with reference to FIG. 14, the size of a polling response frame becomes minimum at 28 bytes when the preamble field is 48 bits long. Further, the time required for transmitting the polling response frame having the minimum size of 28 bytes at a transfer rate of 212 bps is approximately 1.0566 ms (=28 bytes×8 bits/212 kbps).

In the present case, since real data of 8 bytes is included in the polling response frame, the initiator acquires real data of 8 bytes by receiving the polling response frame transmitted by the target.

Therefore, in a case where a polling response frame (FIG. 10) is used for data exchange of real data, a communication time of only approximately 4.0604 ms (=0.6038 ms+2.4 ms+1.0566 ms) at the shortest is required for performing data exchange of real data of 8 bytes, and this communication time is about half of that (approximately 7.7974 ms) required in the case of performing the passive mode communication described above with reference to FIG. 14. That is, it is possible to shorten the communication time.

In the case where it is assumed that the initiator communicates with only one target, there is no need to identify a target in the SDD process, so a NFCID2 for identifying a target needs not be included in the polling response frame (FIG. 10), either. Therefore, in the case where the polling response frame (FIG. 10) is used for data exchange of real data, real data can be placed also in (the portion of) the NFCID2 of 8 bytes in the payload field of the polling response frame. While the leading byte 01H of the payload field of a polling response frame (FIG. 10) indicates that this frame is a polling response frame, real data can be placed also in this leading byte.

Therefore, in the case where the polling response frame (FIG. 10) is used for data exchange of real data, real data is placed in the entire payload field of 17 bytes of the polling response frame, thereby making it possible to perform data exchange of a maximum of 17 bytes of real data by means of one polling response frame.

Here, the mode of communication in which, as described above, data exchange of real data is performed by means of a polling response frame by using the sequence of the SDD process as it is, is referred to as the simple mode.

Figure 16:
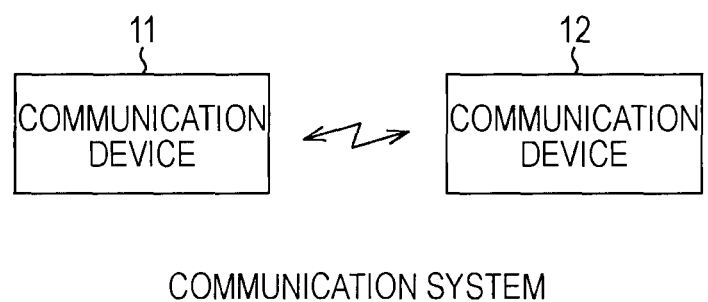
FIG. 16 is a diagram showing an example of the configuration of a communication system that performs near field communication compliant with NFCIP-1 and communication in simple mode.

FIG. 16 shows an example of the configuration of a communication system that is capable of communication in simple mode (near field communication), in addition to the near field communication compliant with NFCIP-1.

In FIG. 16, the communication system includes communication devices 11 and 12 that can perform communication compliant with NFCIP-1, and communication in simple mode.

It should be noted that in the embodiment shown in FIG. 16, for the simplicity of description, it is assumed that of the passive mode and the active mode, the communication devices 11 and 12 implement only the passive mode with regard to NFCIP-1 (are configured so as to be capable of performing only communication in passive mode).

Further, in the embodiment shown in FIG. 16, it is assumed that the communication device 11 functions only as the initiator that transmits data by outputting an electromagnetic wave by itself and modulating the electromagnetic wave, and the communication device 12 functions only as the target that transmits data by performing load modulation on the electromagnetic wave outputted by the initiator.

In the communication system shown in FIG. 16, the communication device 11 serving as the initiator and the communication device 12 serving as the target perform either passive mode communication or simple mode communication to perform data exchange of real data.

Figure 17:
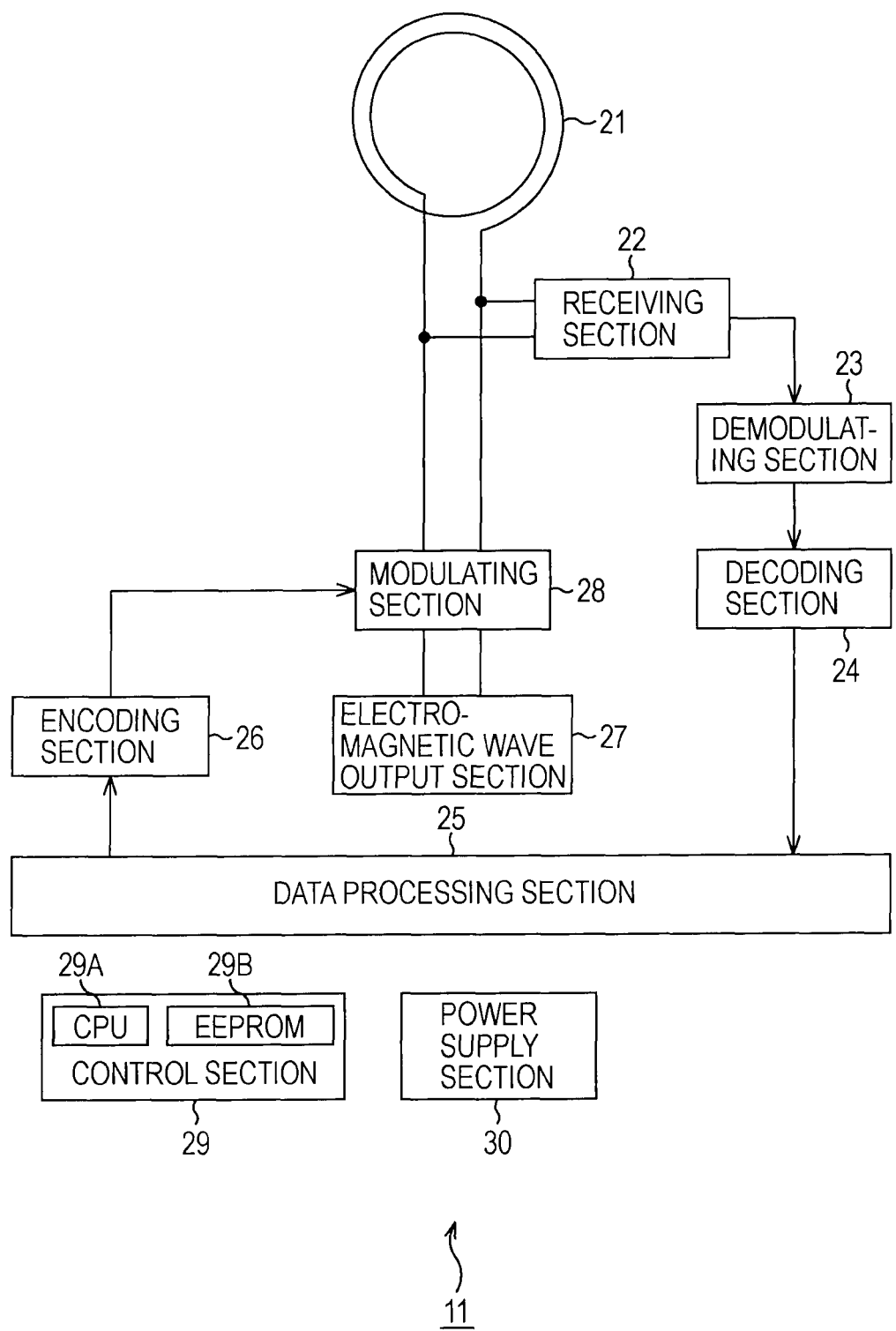
FIG. 17 is a block diagram showing an example of the configuration of a communication device 11.

Next, FIG. 17 shows an example of the configuration of the communication device 11 serving as the initiator shown in FIG. 16.

An antenna 21 forms a closed loop, and outputs an electromagnetic wave as electrical current flowing through the coil changes. Further, electrical current flows through the antenna 21 as magnetic fluxes passing through the coil serving as the antenna 21 change.

A receiving section 22 receives electrical current flowing through the antenna 21, and outputs it to a demodulating section 23. The demodulating section 23 performs demodulation (for example, ASK demodulation) on the signal supplied from the receiving section 22, and supplies the demodulated signal to a decoding section 24. The decoding section 24 decodes, for example, a Manchester code or the like as a demodulated signal supplied from the demodulating section 23, and supplies the data obtained by the decoding to a data processing section 25.

The data processing section 25 performs predetermined processing on the basis of the data supplied from the decoding section 24. Also, the data processing section 25 supplies data to be transmitted to another device, to an encoding section 26.

The encoding section 26 encodes the data supplied from the data processing section 25 into, for example, a Manchester code, and supplies the code to a modulating section 28.

An electromagnetic wave output section 27 supplies the antenna 21 with electric current for allowing the antenna 21 to radiate (an electromagnetic wave as) a carrier wave having a predetermined single frequency $f_c$. In accordance with the signal supplied from the electromagnetic wave output section 27, the modulating section 28 modulates the carrier wave as the electric current supplied to the antenna 21 by the electromagnetic wave output section 27. This allows the antenna 21 to radiate an electromagnetic wave as a modulated signal obtained by modulating the carrier wave in accordance with (Manchester code obtained by encoding) data outputted to the encoding section 26 by the data processing section 25.

As the modulation scheme in the modulating section 28, for example, amplitude shift keying (ASK) can be employed. It should be noted, however, that the modulation scheme in the modulating section 28 is not limited to ASK, and it is also possible to employ PSK (Phase Shift Keying), QAM (Quadrature Amplitude Modulation), and the like. The modulation factor of the amplitude is not limited to numerical values such as 8% to 30%, 50%, and 100%, but a suitable value may be selected.

A control section 29 controls blocks constituting the communication device 11. That is, the control section 29 is configured by, for example, a CPU (Central Processing Unit) 29A, an EEPROM (Electrically and Erasable Programmable Read Only Memory) 29B, a RAM (Random Access Memory) (not shown), and the like. The CPU 29A executes a program stored in the EEPROM 29B, thereby performing control of blocks constituting the communication device 11 and other various kinds of processing. The EEPROM 29B stores a program to be executed by the CPU 29A and data that is necessary for the operation of the CPU 29A.

A series of processes performed by the CPU 29A by executing a program can be performed in such a way that dedicated hardware is provided in place of the CPU 29A and the dedicated hardware performs the processes. In addition to being installed into the EEPROM 29B in advance, a program to be executed by the CPU 29A can be temporarily or permanently stored (recorded) in a removable recording medium, such as a flexible disk, a CD-ROM (Compact Disc Read Only Memory), an MO (Magneto Optical) disk, a DVD (Digital Versatile Disc), a magnetic disk, or a semiconductor memory, and can be provided as so-called packaged software. Furthermore, the program can be transmitted to the communication device 11 by near field communication to be installed into the EEPROM 29B.

A power supply section 30 supplies required power to the individual blocks constituting the communication device 11.

In FIG. 17, representation of lines showing that the control section 29 controls the individual blocks constituting the communication device 11, and representation of lines showing that the power supply section 30 supplies power to the individual blocks constituting the communication device 11 are omitted because they may complicate the drawing.

In the above-described case, the decoding section 24 and the encoding section 26 process the Manchester code. However, the decoding section 24 and the encoding section 26 can selectively process not only the Manchester code, but also one of plural types of code such as modified Miller code and NRZ (Non Return to Zero) code.

The communication device 11 configured as described above functions as the initiator as the control section 29 controls the individual blocks of the communication device 11.

That is, in the communication device 11 as the initiator, when transmitting data (frame), the electromagnetic wave output section 27 supplies the antenna 21 with electric current for allowing the antenna 21 to radiate (an electromagnetic wave as) a carrier wave having a predetermined single frequency $f_c$. Accordingly, an electromagnetic wave as a carrier wave (unmodulated wave) is radiated from the antenna 21.

Further, in the communication device 11, the data processing section 25 supplies data to be transmitted to the target, to the encoding section 26. The encoding section 26 encodes the data supplied from the data processing section 25 into a Manchester code, and supplies the code to the modulating section 28. In accordance with the signal supplied from the encoding section 26, the modulating section 28 modulates the carrier wave as the electric current supplied to the antenna 21 by the electromagnetic wave output section 27. This allows the antenna 21 to radiate an electromagnetic wave obtained by modulating the carrier wave in accordance with data outputted to the encoding section 26 by the data processing section 25, thereby transmitting data to the target.

On the other hand, in the communication device 11 as the initiator, when receiving data (frame) transmitted by the target through load modulation, the receiving section 22 outputs a signal corresponding to electric current on the antenna 21, which changes through load modulation by the target, to the demodulating section 23. The demodulating section 23 performs demodulation on the signal supplied from the receiving section 22, and supplies the demodulated signal to a decoding section 24. The decoding section 24 decodes a Manchester code or the like as a signal supplied from the demodulating section 23, and supplies the data obtained by the decoding to the data processing section 25. The data processing section 25 performs predetermined processing on the basis of the data supplied from the decoding section 24.

Figure 18:
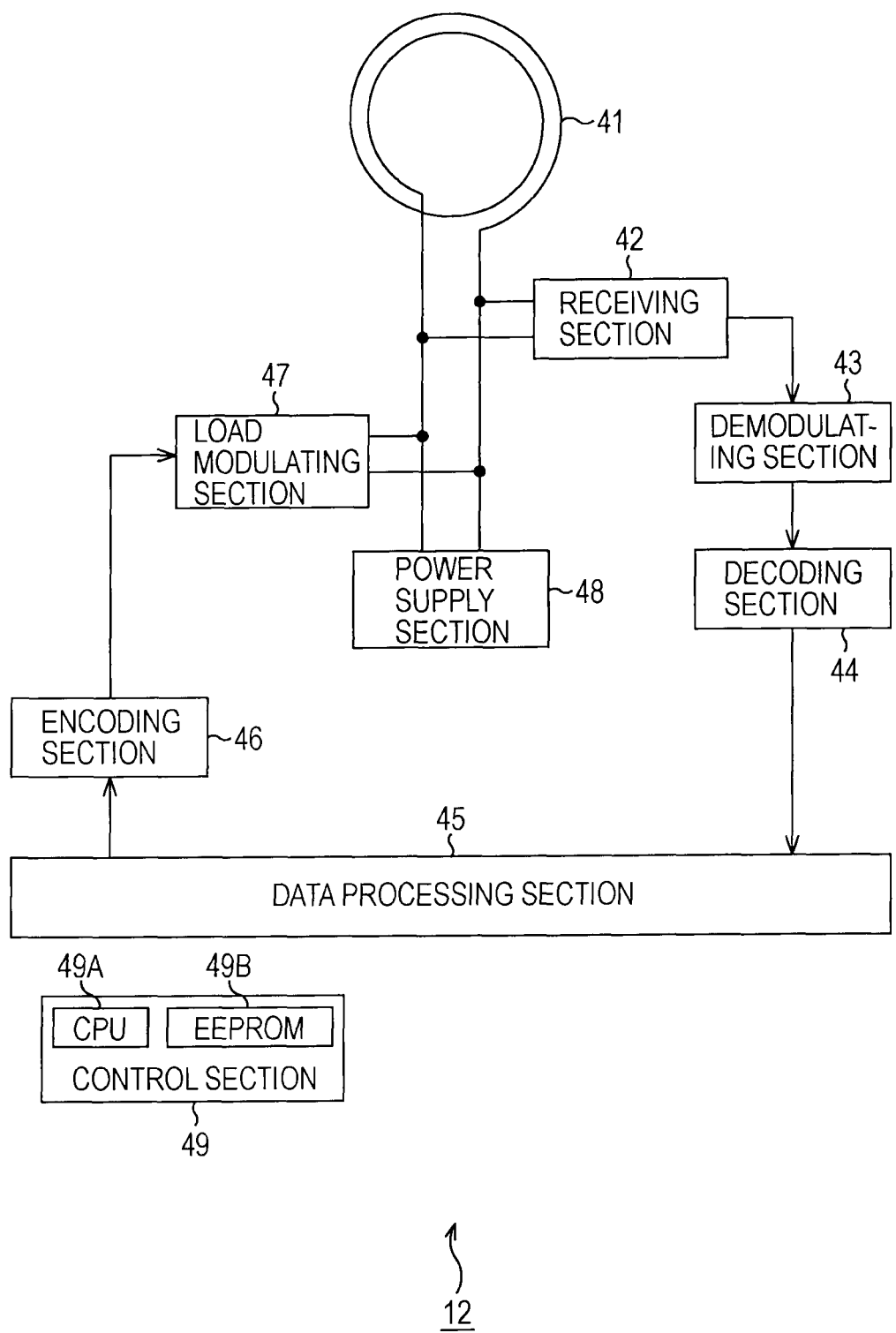
FIG. 18 is a block diagram showing an example of the configuration of a communication device 12.

Next, FIG. 18 shows an example of the configuration of the communication device 12 serving as the target shown in FIG. 16.

An antenna 41 forms a closed loop, and outputs an electromagnetic wave as electrical current flowing through the coil changes. Further, electrical current flows through the antenna 41 as magnetic fluxes passing through the coil serving as the antenna 41 change.

A receiving section 42 receives electrical current flowing through the antenna 41, and outputs it to a demodulating section 43. The demodulating section 43 performs ASK demodulation or the like on the signal supplied from the receiving section 42, and supplies the demodulated signal to a decoding section 44. The decoding section 44 decodes, for example, a Manchester code or the like as a signal supplied from the demodulating section 43, and supplies the data obtained by the decoding to a data processing section 45.

The data processing section 45 performs predetermined processing on the basis of the data supplied from the decoding section 44. Also, the data processing section 45 supplies data to be transmitted to another device, to an encoding section 46.

The encoding section 46 encodes the data supplied from the data processing section 45 into, for example, a Manchester code, and outputs the code to a load modulating section 47.

The load modulating section 47 changes, in accordance with the signal supplied from the encoding section 46, the impedance when viewing the coil serving as the antenna 41 from the outside. When a RF field (magnetic field) is formed around the antenna 41 as a result of another device outputting an electromagnetic wave as a carrier wave, the impedance when viewing the coil serving as the antenna 41 changes, so the RF field around the antenna 41 also changes. Accordingly, the carrier wave as the electromagnetic wave outputted by the other device is modulated (load-modulated) in accordance with the signal supplied from the encoding section 46, and the data outputted to the encoding section 46 by the data processing section 45 is transmitted to the other device outputting the electromagnetic wave.

As the modulation scheme in the load modulating section 47, for example, amplitude shift keying (ASK) can be employed. It should be noted, however, that the modulation scheme in the load modulating section 47 is not limited to ASK, and it is also possible to employ PSK (Phase Shift Keying), QAM (Quadrature Amplitude Modulation), and the like. The modulation factor of the amplitude is not limited to numerical values such as 8% to 30%, 50%, and 100%, but a suitable value may be selected.

A power supply section 48 draws power from the electric current that flows through the antenna 41 due to the RF field formed around the antenna 41, and supplies the power to the individual blocks constituting the communication device 12.

A control section 49 performs control of the individual blocks constituting the communication device 12 or the like. That is, the control section 49 is configured by, for example, a CPU 49A, an EEPROM 49B, a RAM (not shown), and the like. The CPU 49A executes a program stored in the EEPROM 49B, thereby performing control of the individual blocks constituting the communication device 12 and other various kinds of processing. The EEPROM 49B stores a program to be executed by the CPU 49A and data that is necessary for the operation of the CPU 49A.

A series of processes performed by the CPU 49A by executing a program can be performed in such a way that dedicated hardware is provided in place of the CPU 49A and the dedicated hardware performs the processes. In addition to being installed into the EEPROM 49B in advance, a program to be executed by the CPU 49A can be temporarily or permanently stored (recorded) in a removable recording medium, such as a flexible disk, a CD-ROM, an MO disk, a DVD, a magnetic disk, or a semiconductor memory, and can be provided as so-called packaged software. Furthermore, the program can be transmitted to the communication device 11 by near field communication to be installed into the EEPROM 49B.

In FIG. 18, representation of lines showing that the control section 49 controls the individual blocks constituting the communication device 12, and representation of lines showing that the power supply section 48 supplies power to the individual blocks constituting the communication device 12 are omitted because they may complicate the drawing.

While in FIG. 18 the power supply section 48 draws power from the electrical current flowing through the antenna 41, alternatively, for example, a battery can be built in the communication device 12 so that power is supplied to the individual blocks constituting the communication device 12 from the battery.

In the above-described case, the decoding section 44 and the encoding section 46 process the Manchester code. However, the decoding section 44 and the encoding section 46 can selectively process not only the Manchester code, but also one of a plurality of types of code such as modified Miller code and NRZ (Non Return to Zero) code.

The communication device 12 configured as described above functions as the target as the control section 49 controls the individual blocks of the communication device 12.

That is, in the communication device 12 serving as the target, when transmitting data (frame), the data processing section 45 supplies data to be transmitted to the initiator, to the encoding section 46. The encoding section 46 encodes the data supplied from the data processing section 45 into a Manchester code, and outputs the code to the load modulating section 47. The load modulating section 47 changes, in accordance with the signal supplied from the encoding section 46, the impedance when viewing the coil serving as the antenna 41 from the outside.

At this time, the communication device 11 as the initiator is forming a RF field around the antenna 41 by outputting an electromagnetic wave as a carrier wave, and as the impedance when viewing the coil serving as the antenna 41 changes, the RF field around the antenna 41 also changes. Accordingly, the carrier wave as the electromagnetic wave outputted by the initiator is modulated (load-modulated) in accordance with the signal supplied from the encoding section 46, and the data outputted to the encoding section 46 by the data processing section 45 is transmitted to the initiator that is outputting the electromagnetic wave.

On the other hand, in the communication device 12 as the initiator, when receiving data (frame) transmitted by the initiator by modulating the electromagnetic wave outputted by itself, the receiving section 42 outputs to the demodulating section 43 a signal corresponding to the electric current that flows through the antenna 41 in accordance with the electromagnetic wave modulated by the data. The demodulating section 43 performs demodulation on the signal supplied from the receiving section 42, and supplies the demodulated signal to the decoding section 44. The decoding section 44 decodes a Manchester code or the like as a signal supplied from the demodulating section 43, and supplies the data obtained by the decoding to the data processing section 45. The data processing section 45 performs predetermined processing on the basis of the data supplied from the decoding section 44.

Next, referring to the flow chart in FIG. 19, a description will be given of the processing of the communication device 11 as the initiator.

In step S101, the control section 29 (FIG. 17) of the communication device 11 as the initiator sets the communication mode in which communication is performed with the target. That is, the communication device 11 as the initiator determines which one of passive mode communication and simple mode communication is to be performed with the target.

At this time, in a case where, for example, communication for transmitting a large amount of data from the target is to be performed between the communication device 11 as the initiator and the target, in step S101, the communication mode is set to the passive mode. On the other hand, in a case where, for example, communication for transmitting a small amount of data from the target is to be performed between the communication device 11 as the initiator and the target, in step S101, the communication mode is set to the simple mode.

Alternatively, in a case where the communication system in FIG. 16 is applied to, for example, an application in which the number of targets serving as the communicating parties with the communication device 11 as the initiator is not determined (is an indefinite number), in step S101, the communication mode is set to the simple mode. On the other hand, in a case where the communication system in FIG. 16 is applied to, for example, an application which assumes that only one target serves as the communicating party with the communication device 11 as the initiator, in step S101, the communication mode is set to the simple mode.

After the communication mode is determined in step S101, the process proceeds to step S102, where the control section 29 controls the individual blocks of the communication device 11 so as to perform an RFCA process, and when no electromagnetic wave from another device exists, causes outputting of an electromagnetic wave to be started, and the process proceeds to step S103.

In step S103, the control section 29 determines the current communication mode, and if it is determined that the communication mode is set to the passive mode, the process proceeds to step S104, where the control section 29 controls the individual blocks of the communication device 11 so as to perform communication in passive mode.

In step S104, first, steps S104-1 and S104-2 as the SDD process are performed.

Specifically, in step S104-1, the control section 29 controls the individual blocks of the communication device 11 so as to transmit a polling request frame (FIG. 9) where one of the values specified by NFCIP-1 is set in the time slot information TSN.

It should be noted that as described above with reference to FIG. 9, the current NFCIP-1 specifies that the time slot information TSN of 1 byte of the polling request frame transmitted by the SDD process of passive mode communication must have one of the values 00H, 01H, 03H, 07H, 0FH. In step S104-1, a polling request frame with one of these five values 00H, 01H, 03H, 07H, 0FH set in the time slot information TSN is transmitted.

In this case, the 1-byte values 00H, 01H, 03H, 07H, 0FH, which are specified by the current NFCIP-1 as the values that must be set in the time slot information TSN of a polling request frame transmitted by the SDD process of passive mode communication, will be hereinafter referred to as standard values where appropriate.

In the SDD process of passive mode communication, as described above, each of one or more targets receives a polling request frame from the initiator, and transmits, in reply to that polling request frame, a polling response frame (FIG. 10) including a NFCID2 for identifying the target at the timing of a time slot determined by a random number. Accordingly, in step S104-2, the control section 29 controls the individual blocks of the communication device 11 so as to receive the polling response frame transmitted from the target. The NFCID2 for identifying the target is thus acquired, and each of the one or more targets is identified on the basis of that ID.

The processing of steps S104-1 and S104-2, that is, the SDD process thus ends, and in step S104-3, the control section 29 controls the individual blocks of the communication device 11 so as to transmit a command ATR_REQ.

Since a response ATR_RES will be transmitted from the target in reply to the command ATR_REQ from the initiator, in step S104-4, the control section 29 controls the individual blocks of the communication device 11 so as to receive the response ATR_RES from the target, and recognizes the attributes of the target or the like from the response ATR_RES.

Further, in step S104-5, the control section 29 controls the individual blocks of the communication device 11 so as to transmit a command DEP_REQ requesting for real data.

In response to the command DEP_REQ from the initiator, the target will transmit a response DEP_RES including the real data requested for by the command DEP_REQ. Accordingly, in step S104-6, the control section 29 controls the individual blocks of the communication device 11 so as to receive the response DEP_RES from the target, and acquires the real data, which is requested for by the command DEP_REQ, from the response DEP_RES.

That is, when the communication mode is the passive mode, for example, data exchange of real data is performed in the manner as described above with reference to FIG. 14, between the communication device 11 as the initiator and the communication device 12 as the target.

On the other hand, if it is determined in step S103 that the communication mode is set to the simple mode, the process proceeds to step S105, where the control section 29 controls the individual blocks of the communication device 11 so as to transmit a polling request frame (FIG. 9) with a specific value set in the time slot information TSN.

As described above, in the passive mode, one of the five standard values 00H, 01H, 03H, 07H, 0FH is set in the time slot information TSN of 1 byte of a polling request frame. In the simple mode, a 1-byte value other than the five standard values 00H, 01H, 03H, 07H, 0FH is set as a specific value in the time slot information TSN of 1 byte of the polling request frame.

Upon receiving a polling request frame with a specific value set in the time slot information TSN, as will be described later, the target will transmit a polling response frame including real data in the (portion of) Pad of the payload field at the timing of a time slot set in advance. Accordingly, in step S106, the control section 29 controls the individual blocks of the communication device 11 so as to receive the polling response frame transmitted from the target, thereby acquiring real data from the target.

Next, referring to the flow chart in FIG. 20, a description will be given of the processing of the communication device 12 serving as the target.

Figure 19:
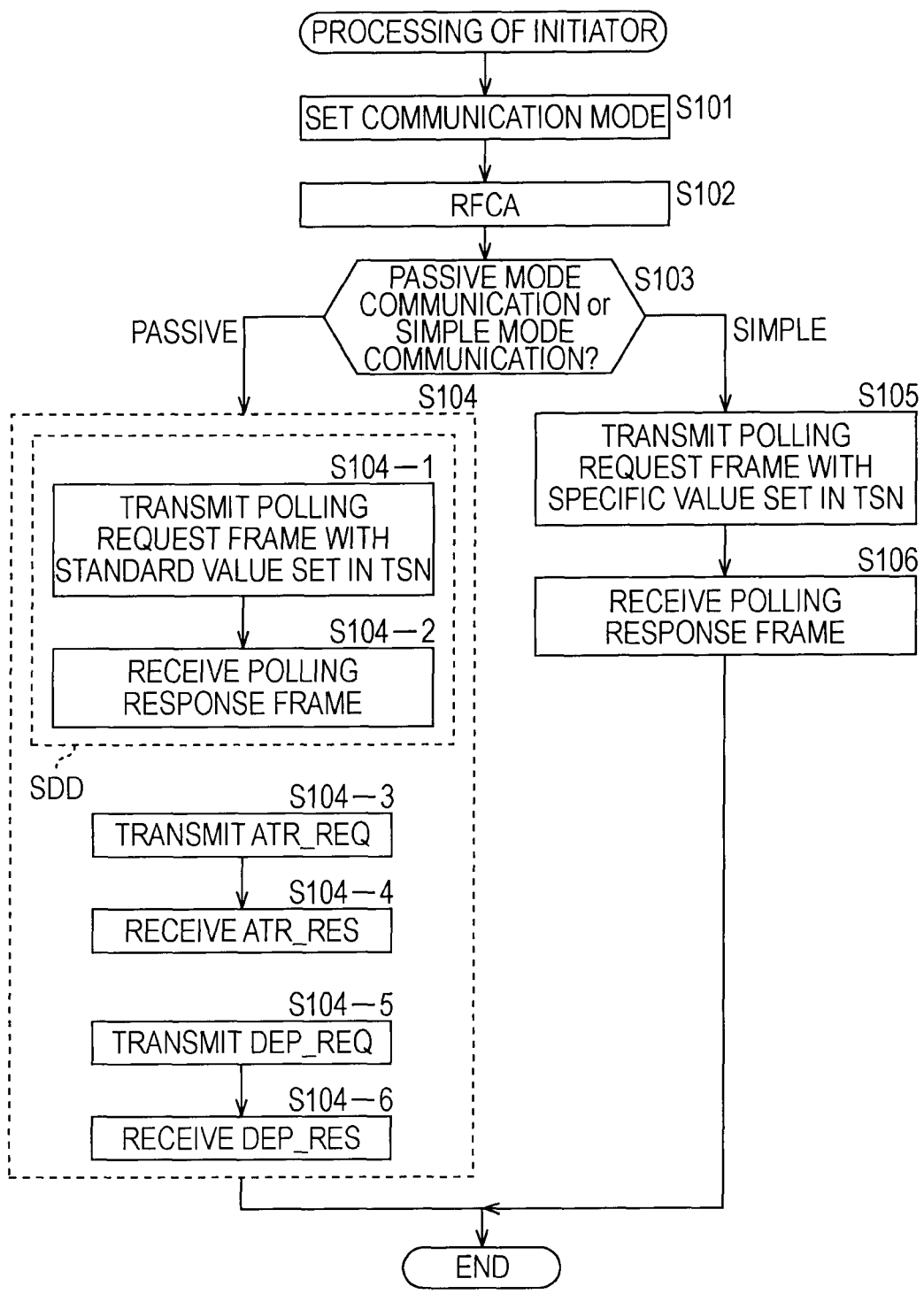
FIG. 19 is a flow chart illustrating the processing of an initiator.

For example, when the communication device 11 as the initiator starts outputting an electromagnetic wave in step S102 of FIG. 19, and the communication device 12 as the target is brought close to the initiator, the power supply section 48 (FIG. 18) of the communication device 12 draws power from the electromagnetic wave from the initiator, and supplies the power to the individual blocks of the communication device 12. Accordingly, the communication device 12 becomes operable.

When the communication device 12 becomes operable, in step S111, the control section 49 controls the individual blocks of the communication device 12 so as to receive a polling request frame transmitted from the initiator.

Then, in step S112, the control section 49 recognizes the time slot information TSN included in the polling request frame (FIG. 9) from the initiator, and determines whether or not the time slot information TSN indicates a standard value (first value) or specific value (second value).

If it is determined in step S112 that the time slot information TSN indicates a standard value, the process proceeds to step S113, where the control section 49 controls the individual blocks of the communication device 12 so as to perform communication in passive mode.

That is, in step S113, first, the processing of steps S113-1 and S113-2 as the SDD process is performed.

Specifically, in step S113-1, the control section 49 generates an integer R within the range of 0 to TSN by a random number, and determines the time slot #R specified by the random number R as the time slot used for transmission of a polling response frame. Then, in step S113-2, the control section 49 controls the individual blocks of the communication device 12 so as to transmit a polling response frame including a NFCID2 at the timing of the time slot #R.

Thereafter, as described above with reference to FIG. 19, the initiator will transmit a command ATR_REQ. Accordingly, in step S113-3, the control section 49 controls the individual blocks of the communication device 12 so as to receive the command ATR_REQ from the initiator. Further, the process proceeds from step S113-3 to step S113-4, where the control section 49 controls the individual blocks of the communication device 12 so as to transmit a response DEP_RES including the real data requested for by the command ATR_REQ from the initiator.

As described above with reference to FIG. 19, the initiator that has received the response ATR_RES will transmit a command DEP_REQ requesting for real data. Accordingly, in step S113-5, the control section 49 controls the individual blocks of the communication device 12 so as to transmit a response DEP_RES including the real data requested for by the command DEP_REQ from the initiator.

In a case where the size of real data is large and thus it is impossible to transmit the entire real data completely by a single frame of response DEP_RES alone, exchange of the command DEP_REQ and the response DEP_RES is performed a plurality of times between the initiator and the target. Real data is thus transmitted in a plurality of times from the target to the initiator.

On the other hand, if it is determined in step S112 that the time slot information TSN indicates a specific value, the process proceeds to step S114, where the control section 49 controls the individual blocks of the communication device 12 so as to transmit a polling response frame including real data in the (portion of) Pad of the payload field, at the timing of a time slot set in advance.

That is, for example, as described above with reference to FIG. 15, a polling response frame including real data in Pad of the payload field is transmitted at the timing of the first time slot #0 of the time slots used in the SDD process.

Therefore, in a case where the real data transmitted by the target to the initiator has a size equal to the size of Pad or less, that is, 8 bytes or less, in step S101 of FIG. 19, the communication device 12 as the initiator sets the simple mode as the communication mode, thereby achieving a reduction in communication time in comparison to the case of performing passive mode communication as described above with reference to FIGS. 14 and 15.

Figure 20:
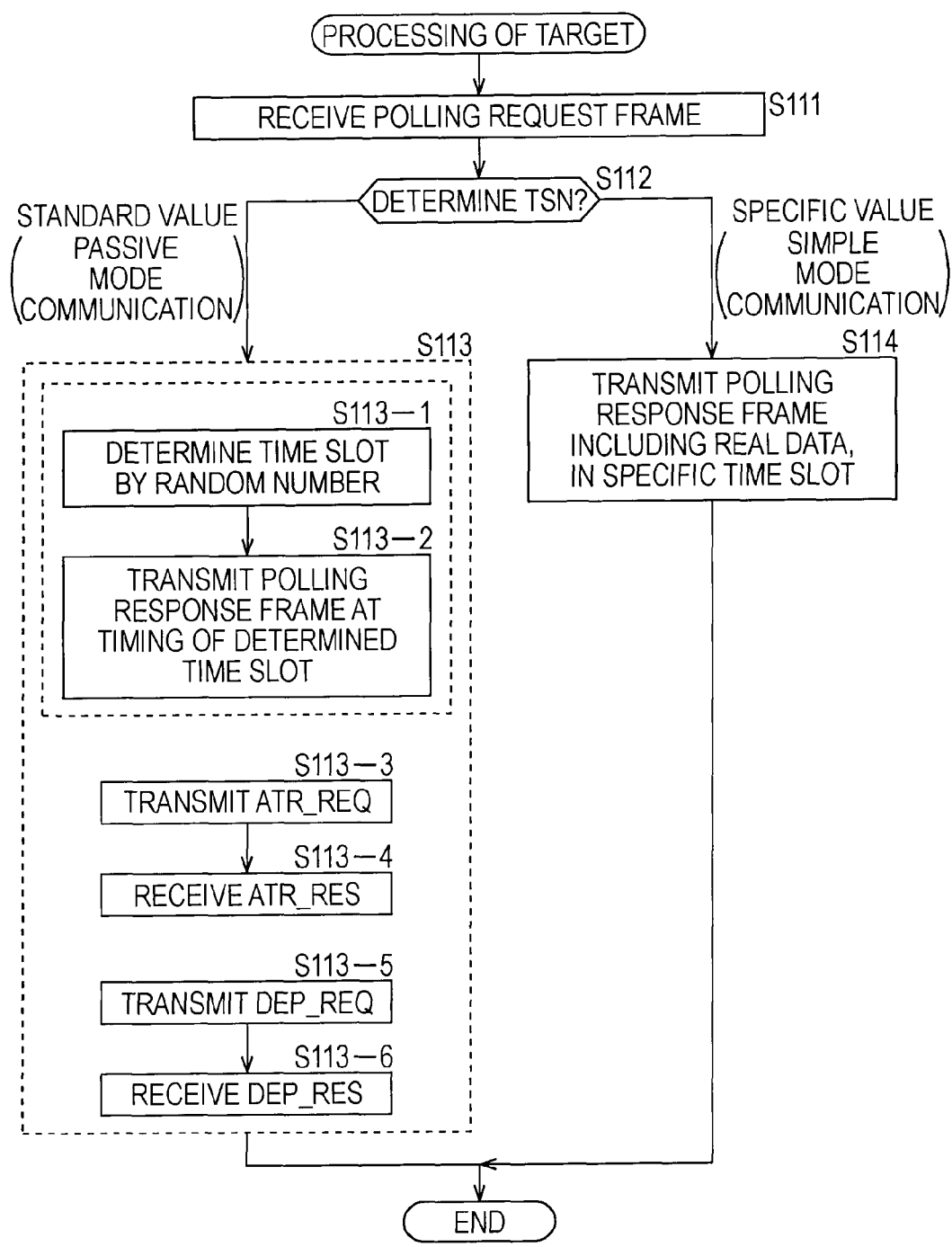
FIG. 20 is a flow chart illustrating the processing of a target.

In FIG. 20, with the time slot set in advance taken as the first time slot #0 of the time slots used in the SDD process, the communication device 12 as the target transmits a polling response frame including real data in Pad of the payload field at the timing of the time slot #0. However, it is also possible to set another time slot in advance as the time slot in which a polling response frame including real data in Pad of the payload field is transmitted.

However, as described above with reference to FIG. 8, a time slot #i is the i+1-th time slot as seen from a polling request frame. Hence, the greatest reduction in communication time can be achieved when the time slot #0 is set as the time slot in which a polling response frame including real data in Pad of the payload field is transmitted.

Next, when the target transmits to the initiator a polling response frame with real data set in Pad of the payload field, the real data is restricted to a size equal to less than the size of Pad, that is, 8 bytes.

Accordingly, for real data with a size exceeding 8 bytes, the real data is split into a plurality of blocks whose size is 8 bytes or less, and a plurality of polling response frames with the plurality of blocks respectively set in Pad can be transmitted from the target to the initiator at respective timings of a plurality of time slots.

That is, in the SDD process, the number of time slots equal to the time slot information TSN plus 1 is prepared. Since the SDD process is a process which takes into consideration situations where a plurality of targets exist around the initiator and which is performed to identify each one of the plurality of targets, and further, in the SDD process, time slots are used so that a collision of polling response frames transmitted from the plurality of targets is avoided as much as possible. Therefore, use of a plurality of time slots by a single target is not expected (In order to avoid collision as much as possible, the number of time slots used by a single target should be restricted to one).

On the other hand, since communication in simple mode is performed under the assumption that, for example, only one target exists around the initiator, there is no collision between polling response frames respectively transmitted from a plurality of targets. Therefore, there is no need to restrict the number of time slots used by a single target to one.

Figure 21:
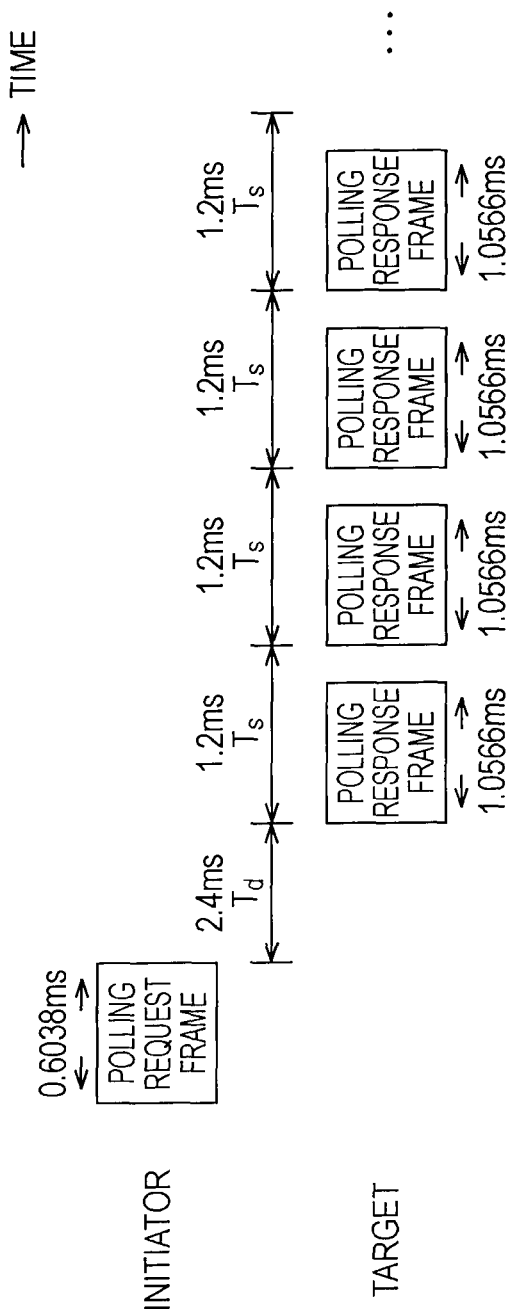
FIG. 21 is a diagram illustrating the transmission of polling response frames using a plurality of time slots.

Accordingly, in simple mode communication, as shown in FIG. 21, a plurality of polling response frames each having real data set in Pad can be transmitted from the target to the initiator at the respective timings of a plurality of time slots.

Now, consider a case where real data of a size exceeding 8 bytes is split into, for example, blocks each having a size of 8 bytes or less. If the number of blocks is TSN+1 at this time, in FIG. 21, a polling response frame where the i-th block (i=1, 2, . . . , TSN+1) of the TSN+1 blocks is set in Pad is transmitted from the target to the initiator at the timing of a time slot #i−1.

It should be noted that since the width (time) $T_s$ of a time slot is approximately 1.2 ms as described above, as shown in FIG. 21, the communication time required for transmitting TSN+1 polling response frames is obtained by adding TSN× 1.2 ms to the communication time (approximately 4.06404 ms) required for transmitting a single polling response frame as shown in FIG. 15.

Next, referring to the flow chart in FIG. 22, a description will be given of the processing of the communication device 11 (FIG. 16) as the initiator in a case where, as shown in FIG. 21, one or more polling request frames are used for communication in simple mode.

In step S121, in the same manner as in step S101 of FIG. 19, the control section 29 (FIG. 17) of the communication device 11 as the initiator sets the communication mode in which communication is performed with the target, and the process proceeds to step S122, where the control section 29 controls the individual blocks of the communication device 11 so as to perform an RFCA process. If no electromagnetic wave from another devices exists, the control section 29 causes outputting of an electromagnetic wave to be started, and the process proceeds to step S123.

In step S123, the control section 29 determines the current communication mode, and if it is determined that the communication mode is set to the passive mode, the process proceeds to step S124, where the control section 29 controls the individual blocks of the communication device 11 so as to perform communication in passive mode.

That is, in step S124, the same processes as those of steps S104-1, S104-2, S104-3, S104-4, S104-5, and S104-6 in FIG. 19 are respectively performed in steps S124-1, S124-2, S124-3, S124-4, S124-5, and S124-6. Accordingly, for example, data exchange of real data is performed by the communication in passive mode described above with reference to FIG. 14, between the communication device 11 as the initiator and the communication device 12 as the target.

On the other hand, if it is determined in step S123 that the communication mode is set to the simple mode, the process proceeds to step S125, where the control section 29 controls the individual blocks of the communication device 11 so as to transmit a polling request frame (FIG. 9) with a specific value set in the time slot information TSN.

Adopted as the specific value set in the time slot information TSN at this time is a size-corresponding value corresponding to the size of real data received by the communication device 11 as the initiator from the target, that is, for example, a subtraction value (or a value equal to or larger than the subtraction value) obtained by raising the decimals of the quotient that results from dividing the size (byte count) of the real data received from the target by 8 bytes as the size of Pad, to the next whole number, and subtracting 1 from the resultant value.

If a size-corresponding value corresponding to the size of real data received from the target is equal to any of the five standard values 00H, 01H, 03H, 07H, 0FH, a value that is larger than that value and is not a standard value is adopted as the specific value.

In this case, since the time slot information TSN is 1 byte long as described above with reference to FIG. 9, its maximum value is FFH, and the maximum number of time slots and therefore the maximum number of polling response frames that can be returned by the target in reply to a single polling request frame is FFH+1. Therefore, in a case where a size-corresponding value corresponding to the size of real data received from the target exceeds FFH, the real data cannot be completely transmitted from the target to the initiator even when Pads of FFH+1 polling response frames as the maximum number of polling response frames are used.

As described above, in a case where a size-corresponding value corresponding to the size of real data received from the target exceeds FFH, that is, in a case where the size of real data exceeds 8 bytes×256, in the simple mode, the real data cannot be transmitted from the target to the initiator solely by using Pads of polling response frames. Accordingly, in step S121, the control section 29 (FIG. 17) of the communication device 11 sets the communication mode to the passive mode that enables exchange of a large amount of real data.

In step S125, when a polling request frame with a specific value set in the time slot information TSN is transmitted, the process proceeds to step S126, where the control section 29 controls the individual blocks of the communication device 11 so as to receive polling response frames transmitted from the target.

That is, as will be described later, the target that has received the polling request frame with a specific value set in the time slot information TSN will transmit, for example, TSN+1 polling response frames where TSN+1 blocks obtained by splitting real data into 8 bytes corresponding to the size of Pad are respectively set in their Pads, at the respective timings of time slots #0 to #TSN. Accordingly, in step S126, each of the TSN+1 polling response frames transmitted at the respective timings of the time slots #0 to #TSN is received.

Then, the process proceeds to step S127, where the control section 29 combines the respective TSN+1 blocks included in the TSN+1 polling response frames to reconstruct the original real data, thereby acquiring real data from the target.

Next, referring to the flow chart in FIG. 23, a description will be given of the processing of the communication device 12 as the target in a case where, as shown in FIG. 21, one or more polling request frames are used for communication in simple mode.

Figure 22:
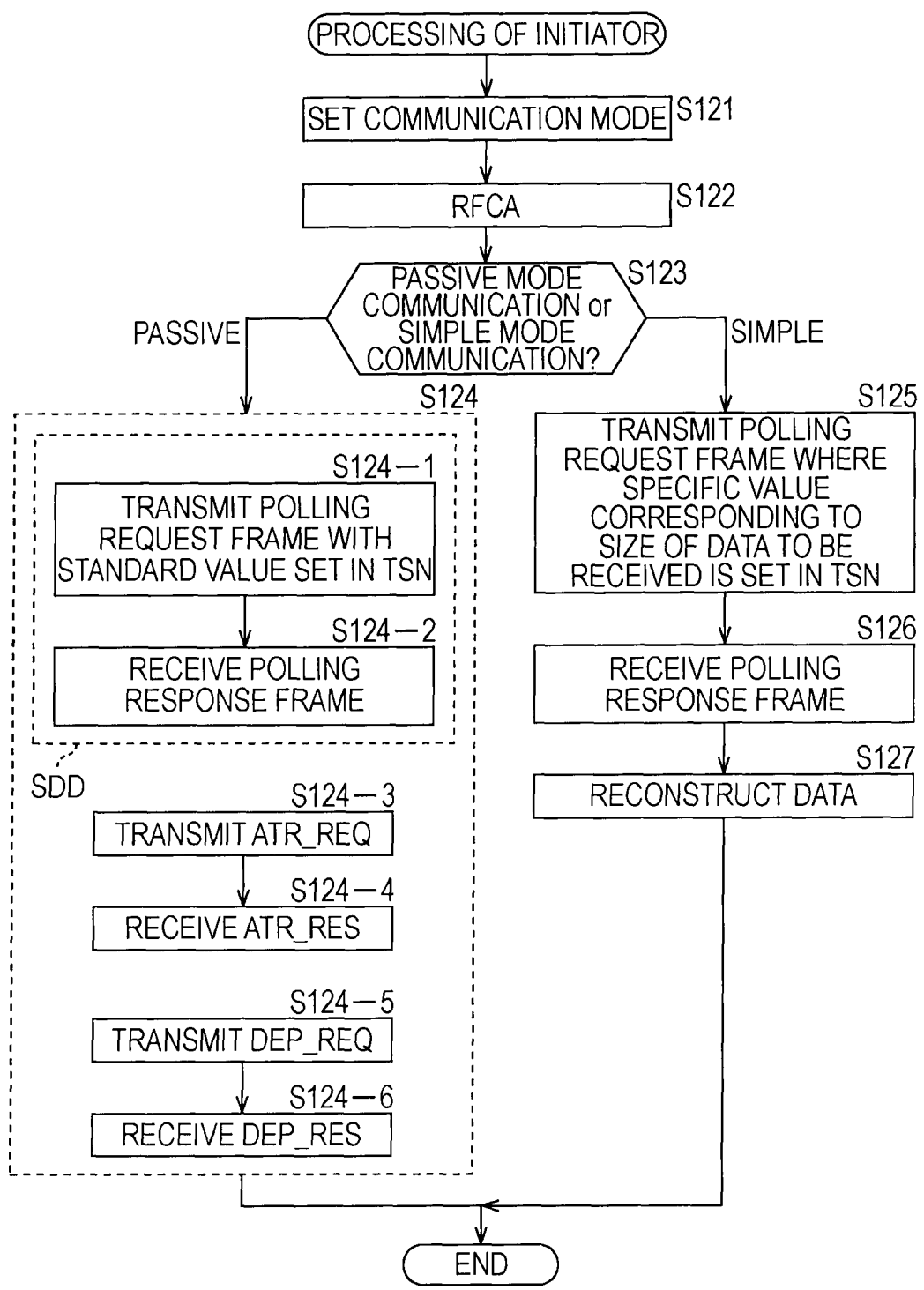
FIG. 22 is a flow chart illustrating the processing of an initiator.

For example, when the communication device 11 as the initiator starts outputting an electromagnetic wave in step S122 of FIG. 22, and the communication device 12 as the target is brought close to the initiator, the power supply section 48 (FIG. 18) of the communication device 12 draws power from the electromagnetic wave from the initiator and supplies the power to the individual blocks of the communication device 12. Accordingly, the communication device 12 becomes operable.

When the communication device 12 becomes operable, in step S131, the control section 49 (FIG. 18) controls the individual blocks of the communication device 12 so as to receive a polling request frame transmitted from the initiator.

Then, in step S132, the control section 49 recognizes the time slot information TSN included in the polling request frame (FIG. 9) from the initiator, and determines whether or not the time slot information TSN indicates a standard value or specific value.

If it is determined in step S132 that the time slot information TSN indicates a standard value, the process proceeds to step S133, where the control section 49 controls the individual blocks of the communication device 12 so as to perform communication in passive mode.

That is, in step S133, the same processes as those of steps S113-1, S113-2, S113-3, S113-4, S113-5, and S113-6 in FIG. 20 are respectively performed in steps S133-1, S133-2, S133-3, S133-4, S133-5, and S133-6. Accordingly, for example, data exchange of real data is performed by the communication in passive mode described above with reference to FIG. 14, between the communication device 11 as the initiator and the communication device 12 as the target.

On the other hand, if it is determined in step S132 that the time slot information TSN indicates a specific value, the process proceeds to step S134, where the control section 49 controls the individual blocks of the communication device 12 so as to transmit TSN+1 polling response frames respectively including TSN+1 blocks obtained by splitting real data into parts having the size of Pad, at the respective timings of the time slots #0 to #TSN as the time slots set in advance. That is, a polling response frame where the i-th block (i=1, 2, . . . , TSN+1) of the TSN+1 blocks is set in Pad is transmitted from the target to the initiator at the timing of a time slot #i−1.

It should be noted that when real data is split into blocks with the size of Pad, there may be times when a block whose size is less than the size of Pad is generated. Such a block with a size less than the size of Pad is changed into a block having the size of Pad by, for example, padding.

In this way, even by communication in simple mode, data of up to a certain size can be transmitted from the target to the initiator by using a plurality of polling response frames.

In this case, in simple mode communication, the start position (the timing of start) of each of a plurality of time slots used for transmission of a plurality of polling response frames conforms to the specification of NFCIP-1 (ISO/IEC 18092). Further, the format of polling response frames transmitted by the target at the timing of respective time slots also conforms to the format specified by NFCIP-1 shown in FIG. 10.

Therefore, with regard to polling response frames transmitted by the target in simple mode communication, the initiator can recognize the start of each polling response frame by the preamble in its preamble field (FIG. 10). Further, with regard to polling response frames transmitted by the target in simple mode communication, the initiator can achieve synchronization by the synchronization pattern in their synchronization fields (FIG. 10).

It should be noted that in the communication device 12 as the target, regardless of whether real data is transmitted by using a single polling response frame or a plurality of polling response frames, an error detection code or error correction code such as CRC or ECC (Error Checking and Correction) is added to the real data depending on the contents or intended use of the real data, and the real data with the error detection code or error correction code added thereto as a whole can be transmitted by using one or a plurality of polling response frames.

Further, in a case where real data is split into a plurality of blocks, and the plurality of blocks are transmitted by using a plurality of polling response frames, an error detection code or error correction code can be added to each of the blocks. However, in this case, it is necessary to split real data in such a way that the size of each block with the error detection code or error correction code added thereto is equal to or smaller than the size of Pad.

By adding an error detection code or error correction code in this way, it is possible to perform error detection or error correction on the initiator side.

Further, real data may be interleaved.

It should be noted that in a case where, on the target side, real data is split into a plurality of blocks, and the plurality of blocks are transmitted by using a plurality of polling response frames, the initiator recognizes in advance the splitting method in which the target slits real data into a plurality of blocks (including the size of blocks into which real data is to be split), and reconstructs the original real data from the plurality of blocks on the basis of the splitting method.

In the above-described case, real data is split into blocks with the size of Pad, that is, blocks of a fixed size, the method of splitting real data is not limited to this. That is, for example, real data can be split into blocks of a variable size equal to or smaller than the size of Pad. It should be noted, however, that if the size of blocks is less than the size of Pad, the extra size is padded when setting the blocks in Pads of polling response frames.

Figure 23:
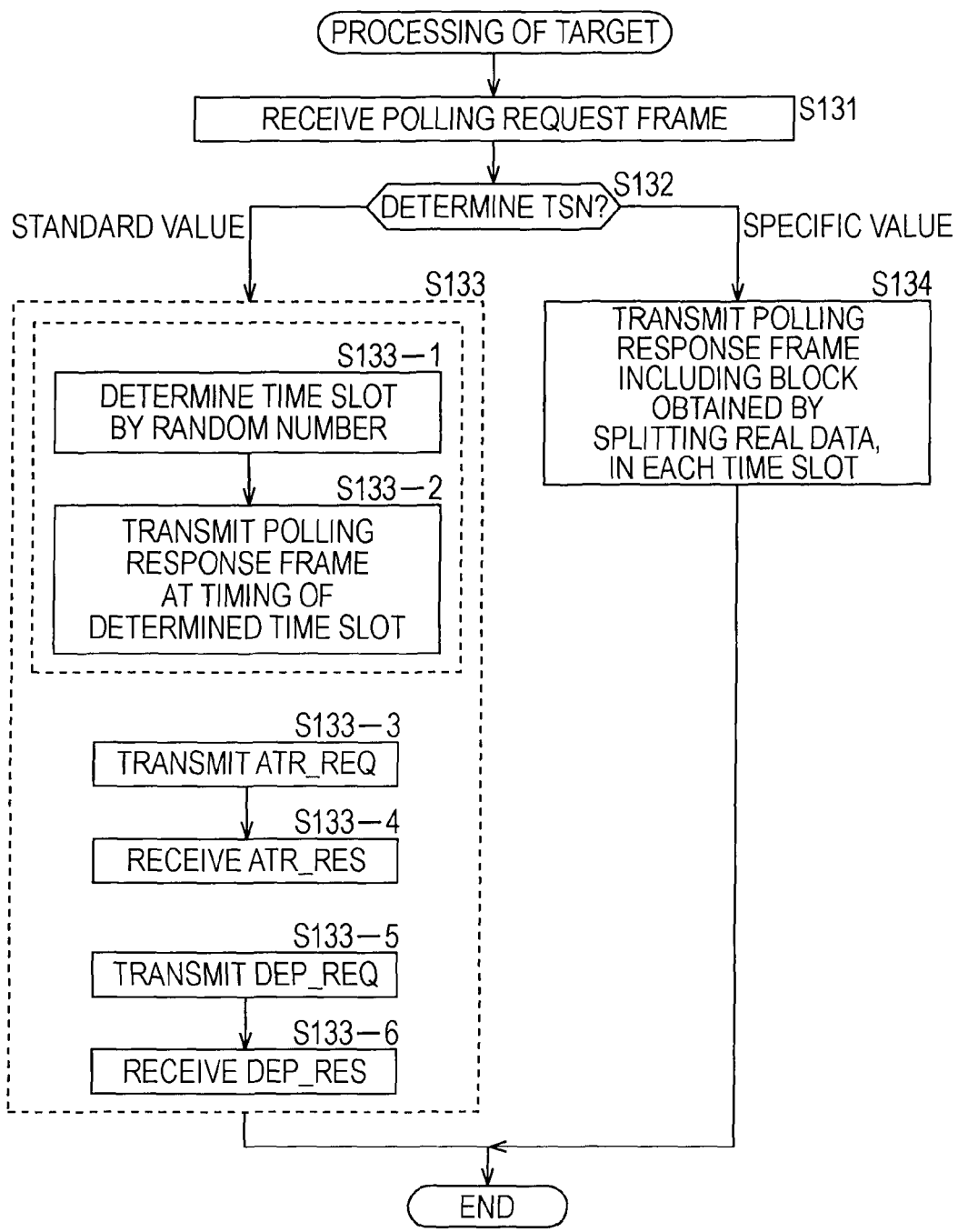
FIG. 23 is a flow chart illustrating the processing of a target.

Next, in the embodiment shown in FIGS. 21 to 23, on the basis of the time slot information TSN included in a polling request frame transmitted by the initiator, the target transmits TSN+1 polling response frames at the respective timings of the time slots #0 to #TSN. In other words, the target transmits polling response frames by using all of the time slots #0 to #TSN. However, as shown in FIG. 24, it is also possible, for example, to select N time slots used for the transmission of polling response frames, N being a number not smaller than 1 and not larger than SN+1, from among the time slots #0 to #TSN, and transmit polling response frames by using only the N time slots.

Figure 24:
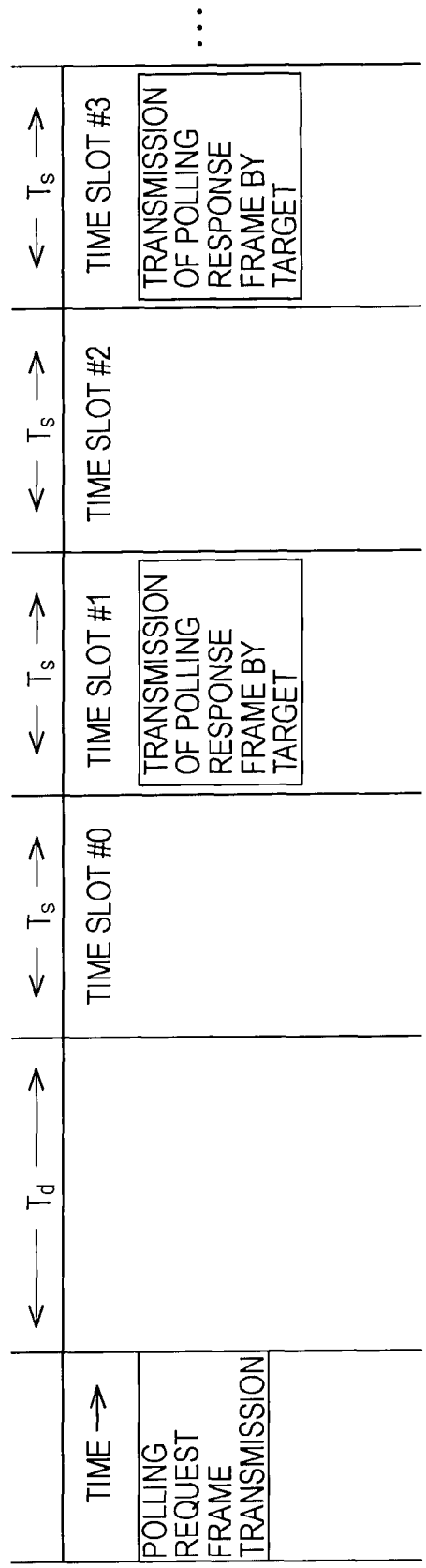
FIG. 24 is a diagram illustrating the transmission of polling response frames using N time slots selected from among time slots #0 to #TSN.

In this case, in FIG. 24, two polling response frames are transmitted respectively at the timings of two time slots #1 and #3 selected from among the time slots #0 to #TSN.

Next, referring to the flow chart in FIG. 25, a description will be given of the processing of the communication device 11 (FIG. 16) as the initiator in a case where, as shown in FIG. 24, N time slots selected from among the time slots #0 to #TSN are used in simple mode communication.

In step S141, in the same manner as in step S101 of FIG. 19, the control section 29 (FIG. 17) of the communication device 11 as the initiator sets the communication mode in which communication is performed with the target, and the process proceeds to step S142, where the control section 29 controls the individual blocks of the communication device 11 so as to perform an RFCA process. If no electromagnetic wave from another device exists, the control section 29 causes output of an electromagnetic wave to be started, and the process proceeds to step S143.

In step S143, the control section 29 determines the current communication mode, and if it is determined that the communication mode is set to the passive mode, the process proceeds to step S144, where the control section 29 controls the individual blocks of the communication device 11 so as to perform communication in passive mode.

That is, in step S144, the same processes as those of steps S104-1, S104-2, S104-3, S104-4, S104-5, and S104-6 in FIG. 19 are respectively performed in steps S144-1, S144-2, S144-3, S144-4, S144-5, and S144-6. Accordingly, for example, data exchange of real data is performed by the communication in passive mode described above with reference to FIG. 14, between the communication device 11 as the initiator and the communication device 12 as the target.

On the other hand, if it is determined in step S143 that the communication mode is set to the simple mode, the process proceeds to step S145, where the control section 29 controls the individual blocks of the communication device 11 so as to transmit a polling request frame (FIG. 9) with a specific value (1-byte value other than a standard value) set in the time slot information TSN.

It should be noted that in this case, on the basis of the time slot information TSN, the target transmits polling response frames by using the N time slots selected from among the time slots #0 to #TSN. At this time, it is assumed that which N time slots of the time slots #0 to #TSN are to be used in transmitting polling response frames is set (determined) in advance for the initiator and the target with respect to each value of (specific value set in) the time slot information TSN, for example.

Then, in step S145, a polling request frame including the time slot information TSN in which a specific value corresponding to the N time slots used for the transmission of polling response frames is set, is transmitted.

After the transmission of a polling response frame in step S145, the process proceeds to step S147, where the control section 29 controls the individual blocks of the communication device 11 so as to receive polling response frames transmitted from the target.

That is, the target that has received a polling request frame with a specific value set in the time slot information TSN will transmit N polling response frames including (blocks obtained by splitting) real data at the respective timings of the N time slots of the time slots #0 to #TSN which are set in advance with respect to the time slot information TSN. Accordingly, in step S147, each of the N polling response frames transmitted at the respective timings of the N time slots is received.

Then, the process proceeds to step S149, where the control section 29 combines the N blocks respectively included in the N polling response frames to reconstruct the original real data, thereby acquiring real data from the target.

Next, referring to the flow chart in FIG. 26, a description will be given of the processing of the communication device 12 as the target in a case where, as shown in FIG. 24, N time slots selected from among the time slots #0 to #TSN are used in simple mode communication.

Figure 25:
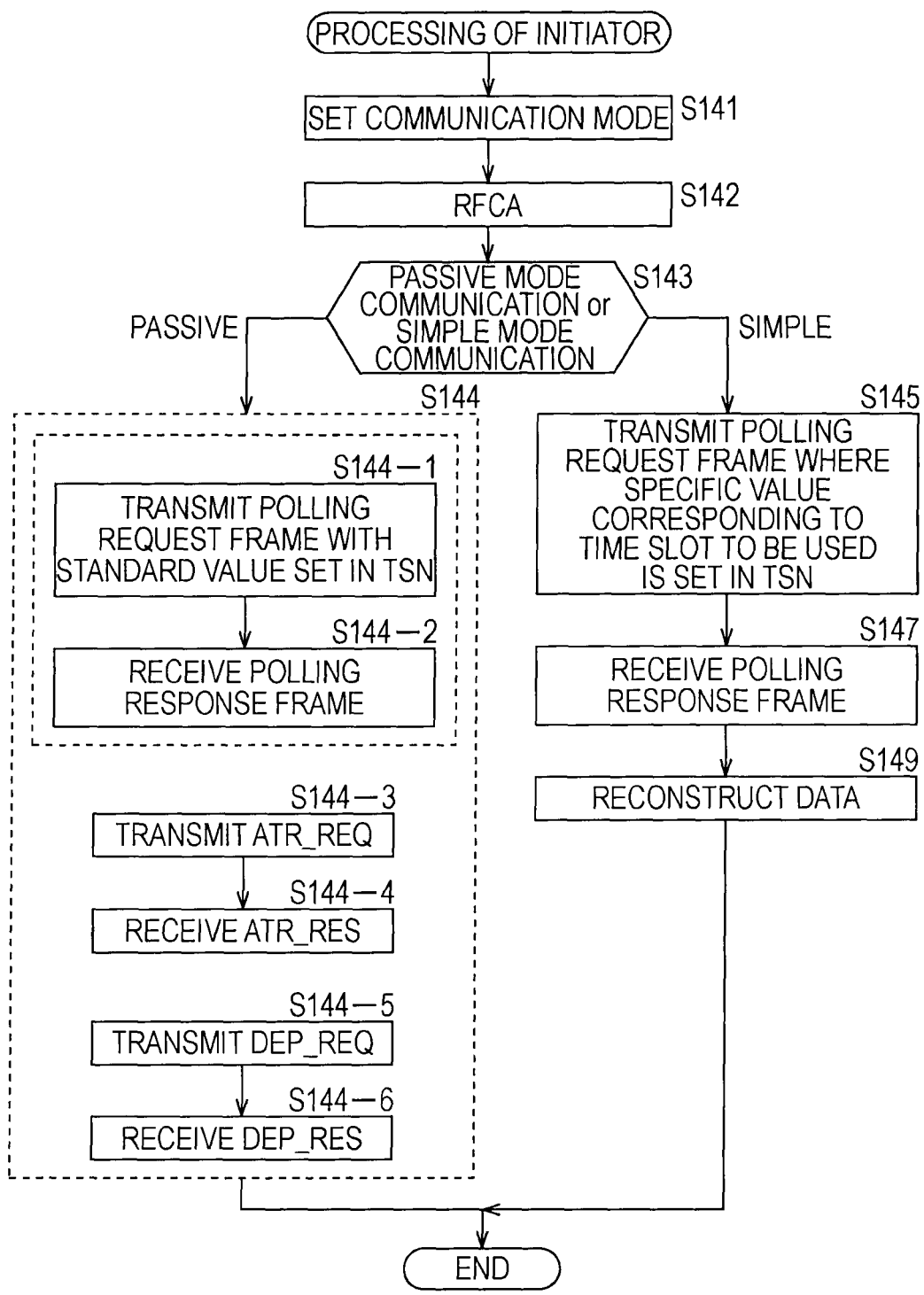
FIG. 25 is a flow chart illustrating the processing of an initiator.

For example, when the communication device 11 as the initiator starts outputting an electromagnetic wave in step S142 of FIG. 25, and the communication device 12 as the target is brought close to the initiator, the power supply section 48 (FIG. 18) of the communication device 12 draws power from the electromagnetic wave from the initiator and supplies the power to the individual blocks of the communication device 12. Accordingly, the communication device 12 becomes operable.

When the communication device 12 becomes operable, in step S151, the control section 49 (FIG. 18) controls the individual blocks of the communication device 12 so as to receive a polling request frame transmitted from the initiator.

Then, in step S152, the control section 49 recognizes the time slot information TSN included in the polling request frame (FIG. 9) from the initiator, and determines whether or not the time slot information TSN indicates a standard value or specific value.

If it is determined in step S152 that the time slot information TSN indicates a standard value, the process proceeds to step S153, where the control section 49 controls the individual blocks of the communication device 12 so as to perform communication in passive mode.

That is, in step S153, the same processes as those of steps S113-1, S113-2, S113-3, S113-4, S113-5, and S113-6 in FIG. 20 are respectively performed in steps S153-1, S153-2, S153-3, S153-4, S153-5, and S153-6. Accordingly, for example, data exchange of real data is performed by the communication in passive mode described above with reference to FIG. 14, between the communication device 11 as the initiator and the communication device 12 as the target.

On the other hand, if it is determined in step S152 that the time slot information indicates a specific value, the process proceeds to step S154 where, on the basis of the time slot information TSN, the control section 49 selects N time slots used for the transmission of polling response frames from among the time slots #0 to #TSN, that is, selects the N time slots set in advance with respect to the time slot information TSN, and the process proceeds to step S155.

In step S155, the control section 49 controls the individual blocks of the communication device 12 so as to, for example, transmit N polling response frames respectively including N blocks obtained by splitting real data, at the respective timings of the N time slots selected in step S154.

It should be noted that in this case, it is assumed that the size of each block obtained by splitting real data into N blocks is equal to or less than the size of Pad.

In this way, by transmitting polling response frames by using N time slots selected from among the time slots #0 to #TSN in simple mode communication, provided that N is a plural number, as in the embodiment shown in FIGS. 21 to 23, data of up to a certain size can be transmitted from the target to the initiator even by simple mode communication.

Further, with respect to the time slot information TSN, the N time slots used for the transmission of polling response frames are hidden in secret except for the communication devices 11 and 12 (FIG. 16). Therefore, devices other than the communication devices 11 and 12 cannot tell at the timing of which time slots the polling response frames including (blocks of) real data will be transmitted. From this point of view, it can be said that enhanced resistance against eavesdropping from the outside, that is, enhanced security is accomplished.

In the above-described embodiment, it is assumed that in simple mode communication, one target serves as the party with which the initiator communicates. However, if specified in advance, a plurality of targets may serve as the parties with which the initiator communicates instead of one target, and simple mode communication can be performed between each of the plurality of targets and the initiator.

Figure 27:
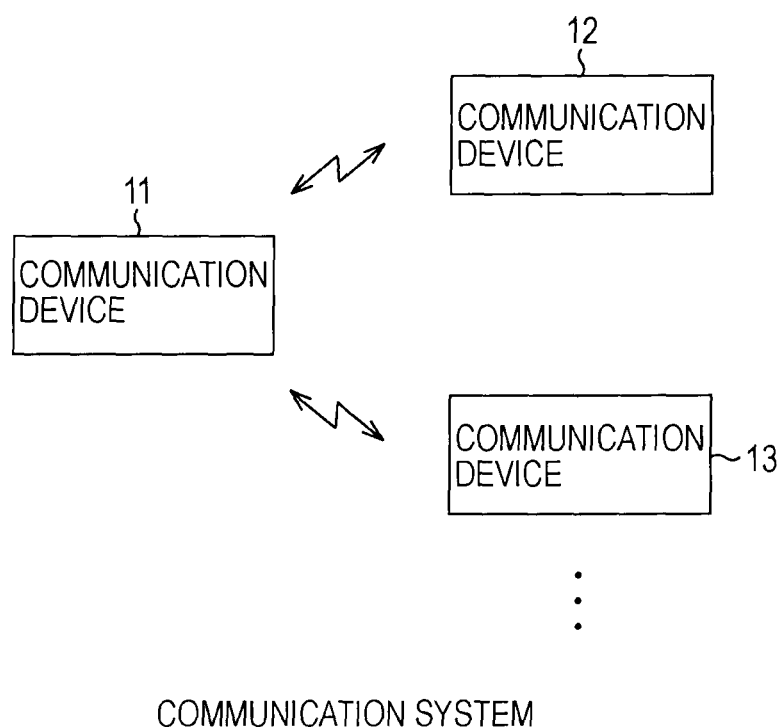
FIG. 27 is a diagram showing another example of the configuration of a communication system that performs near field communication compliant with NFCIP-1 and communication in simple mode.

FIG. 27 shows another example of the configuration of a communication system capable of communication in simple mode, in addition to the near field communication compliant with NFCIP-1. It should be noted that in the drawing, portions corresponding to those in FIG. 16 are denoted by the same symbols.

In the embodiment shown in FIG. 27, the communication system includes the communication devise 11 and 12, and a communication device 13.

The communication device 13 is configured in the same manner as the communication device 12. Therefore, the communication device 13 implements only the passive mode with regard to NFCIP-1. Further, the communication device 13 functions only as the target that transmits data by load-modulating the electromagnetic wave outputted by the initiator.

The communication system in FIG. 27 is applied to an application which assumes that, for example, the initiator communicates with two or less (1 or more) targets.

Examples of an application which assumes that the initiator communicates with two or less targets include one in which a R/W as the initiator is installed at the gate for entry to an attraction in an amusement park, an IC card as a target, which functions as the passport (ticket) for using the attraction, is issued to the user, and the validity of the passport is checked at the gate.

That is, in the amusement park, an IC card storing information on the passport expiration date is issued to the user. In particular, with respect to a pair of users as a so-called couple such as a husband and a wife, for example, IC cards each storing information on the passport expiration date and serving as two targets #1 and #2 are issued. Then, one of the pair of users holds the two IC cards respectively issued to the pair of users, over the R/W one on top of the other. In this case, real data indicating the expiration date stored in each of the two IC cards is transmitted from the IC card to the R/W, and the expiration date indicated by the real data is checked by the R/W. That is, passport expiration dates for two persons are checked at once.

Figure 28:
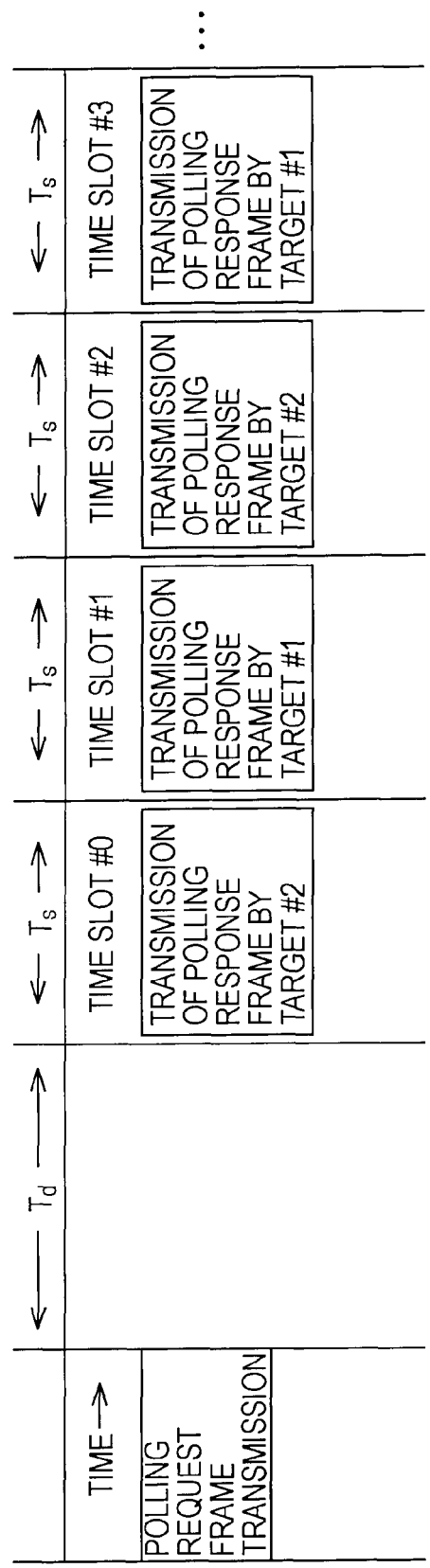
FIG. 28 is a diagram illustrating communication in simple mode between an initiator and each of a plurality of targets.

Now, consider a case where, in simple mode communication, two targets, the communication device 12 as the first target #1, and the communication device 13 as the second target #2, are the parties with which the communication device 11 as the initiator communicates. In this case, for example, as shown in FIG. 28, simple mode communication is performed between the initiator and each of the two targets #1, #2.

That is, with respect to a polling request frame from the initiator, the target #1 selects N time slots, where N is 1 or larger and TSN+1 or smaller, from among the time slots #0 to #TSN on the basis of the time slot information TSN included in that polling request frame, and transmits polling response frames by using the N time slots. Likewise, with respect to a polling request frame from the initiator, the target #2 selects N' time slots, where N' is 1 or larger and TSN+1 or smaller, from among the time slots #0 to #TSN on the basis of the time slot information TSN included in that polling request frame, and transmits polling response frames by using the N' time slots.

In this case, N, N', TSN satisfy the expression TSN+1 N+N'.

Further, the N time slots used by the target #1 and the N' time slots used by the target #2 are set for each value of time slot information TSN in advance so as not to overlap.

In the embodiment in FIG. 28, with respect to the time slot information TSN included in the polling request frame transmitted by the initiator, the time slots used by the targets #1 and the time slots used by the targets #2 are respectively set as time slots #1, #3, . . . , and time slots #0, #2, . . . in advance. In accordance with this setting, the target #1 transmits polling response frames at the respective timings of time slots #1, #3, . . . , and the target #2 transmits polling response frames at the respective timings of time slots #0, #2, . . . .

In the embodiment shown in FIGS. 27 and 28, with respect to the polling request frame transmitted by the communication device 11 as the initiator, the two targets, the communication device 12 as the target #1 and the communication device 13 as the target #2, respectively transmit polling response frames at the timings of non-overlapping time slots. However, the number of targets that return (transmit) polling response frames with respect to a polling request frame from the initiator, that is, the number of targets that performs communication in simple mode with the initiator is not limited to two.

That is, the number of targets that perform communication in simple mode with the initiator can be set to an arbitrary number that is 1 or larger and TSN+1 or smaller.

It should be noted, however, that the maximum number of targets that perform communication in simple mode with the initiator needs to be set (determined) in advance. In addition, the time slots respectively used by the maximum number of targets need to be set from among the TSN+1 time slots in advance so as not to overlap.

FIG. 29 shows time slots respectively used by four targets #1, #2, #3, #4 in a case where the maximum number of targets that perform communication in simple mode with the initiator is set to four (four kinds) in advance.

That is, FIG. 29 shows (an example of how to set) time slots respectively used by the four targets #1, #2, #3, #4 in a case where the time slot information TSN indicates 22.

The marks x in FIG. 29 indicate time slots used by the targets. Thus, in FIG. 29, a setting is made in advance such that the time slots used by the target #1 are time slots #1, #11, #19, #20, #22, the time slots used by the target #2 are time slots #4, #6, #13, #17, #21, the time slots used by the target #3 are time slots #2, #5, #9, #12, #15, and the time slots used by the target #4 are time slots #3, #7, #10, #14, #18.

Now, a series of time slots set in advance as the time slots to be used by the targets are referred to as a channel, and the channel to be used by a target #i is described as a channel #i. In this case, in FIG. 29, with the time slots #1, #11, #19, #20, #22 set as a channel #1, the time slots #4, #6, #13, #17, #21 set as a channel #2, the time slots #2, #5, #9, #12, #15 set as a channel #3, and the time slots #3, #7, #10, #14, #18 set as a channel #4, the four targets #1 to #4 transmit (return) polling response frames by using the channels #1 to #4, respectively, in reply to a polling request frame from the initiator.

For each initiator and target, a table (hereinafter, referred to as channel table as appropriate) as shown in FIG. 29 which illustrates (time slots constituting) a channel #i to be used by the target #i is stored in association with each value of time slot information (for example, stored in the EEPROM 29B (FIG. 17) and the EEPROM 49B (FIG. 18)). In accordance with the size of real data received from the target, for example, the initiator transmits a polling request frame including time slot information TSN of a value that allows use of a channel constituted by the number of time slots necessary for transmitting real data of that size.

On the other hand, the target #i receives the polling request frame from the initiator, recognizes the time slots constituting the channel #i used by the target #i itself, from the channel table associated with the time slot information TSN included in that polling request frame, and transmits polling response frames including (blocks obtained by splitting) real data by using the time slots.

That is, as described above, in simple mode communication, in a case where the initiator communicates with each of targets #1 to #M not more than the maximum number of targets set in advance, the initiator performs the same processing as that described above in the flow chart of FIG. 25.

It should be noted, however, that in step S145 of FIG. 25, in accordance with the size of real data received from each of the plurality of targets #1 to #M, the initiator transmits a polling request frame including time slot information TSN of a value that allows use of a channel constituted by the number of time slots necessary for each of the targets #1 to #M to transmit real data of that size.

Further, in step S149, by referring to the channel table (FIG. 29), the control section 29 recognizes the time slots in which the plurality of targets #1 to #M respectively transmit polling response frames. Accordingly, for each one of the plurality of targets #1 to #M, blocks included in each of one or more polling response frames transmitted from that target are combined to reconstruct the original real data.

In this case, as described above, by referring to the channel table (FIG. 29), the initiator can recognize the time slot in which the i-th target #i of the targets #1 to #M transmits a polling response frame, so the polling response frame transmitted from the target #i can be recognized on the basis of the time slot in which the polling response frame was transmitted.

It should be noted that the polling response frame transmitted from the target #i can be also recognized from a NFCID 2 included in the polling response frame (FIG. 10).

Figure 26:
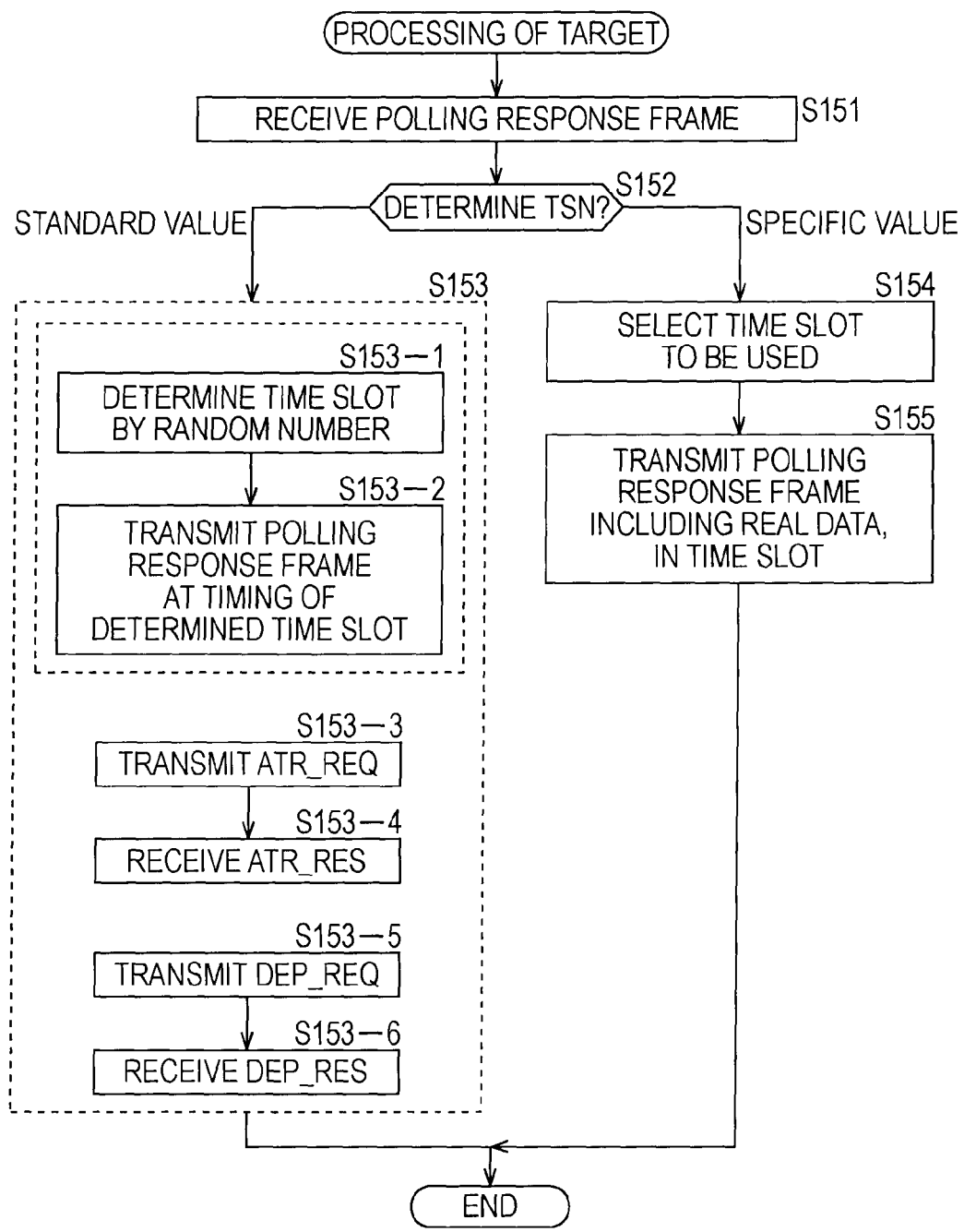
FIG. 26 is a flow chart illustrating the processing of a target.

On the other hand, each of the plurality of targets #1 to #M performs the same processing as that described in the flow chart of FIG. 26.

It should be noted, however, that in step S154 of FIG. 26, on the basis of the channel table (FIG. 29) corresponding to the time slot information TSN included in a polling request frame from the initiator, the i-th target #i of the targets #1 to #M recognizes (selects) one or more time slots constituting the channel #i that should be used by itself.

Further, in step S155, provided that the number of time slots constituting the channel #i is N, the target #i splits real data into N blocks, and transmits N polling response frames respectively including the N blocks at the respective timings of the N time slots constituting the channel #i.

As described above, even when there are a plurality of targets with which the initiator communicates, simple mode communication can be performed between each of the plurality of targets and the initiator.

In this case, of the targets #1 to #M not larger than the maximum number of targets, the number of targets #i that use the channel #i must be one. That is, of the targets #1 to #M not larger than the maximum number of targets, there should not be more than one target #i that uses the channel #i.

It should be noted that since the channel table is hidden in secret except for the initiator and a plurality of targets that can perform simple mode communication, devices other than the initiator and the plurality of targets cannot tell which target transmits a polling response frame including (blocks of) real data in which time slot, making it difficult to reconstruct the original real data transmitted by each of the plurality of targets. From this point of view, it can be said that enhanced security is achieved.

Further, as for the channel table set for each value of time slot information TSN, a plurality of channel tables containing different sets of time slots constituting a channel are prepared in advance, and in the initiator and the target, the channel table to be referred to can be changed at a predetermined time interval. In this case, since the time slot used by the target is changed at a predetermined time interval, it is possible to achieve enhanced security.

As described above, in the communication system shown in FIG. 16 or FIG. 27, as specified by NFCIP-1 (ISO/IEC 18092), the communication device 11 as the initiator has a function of receiving polling response frames transmitted at the respective timings of a plurality of time slots in response to one polling request frame transmitted by the initiator.

While NFCIP-1 specifies that Pad of a polling response frame be ignored, the communication devices 12 and 13 as the targets have a function of storing (setting) real data in Pad of a polling response frame for transmission to the initiator.

Further, the communication devices 12 and 13 as the targets has a function whereby, if the entire real data cannot be completely stored into one Pad, real data is split into a plurality of blocks and stored into Pads of a plurality of polling response frames.

Further, the communication device 11 as the initiator has a function of reconstructing real data (block) stored in Pads of polling response frames transmitted by a single target at the timing of one or more time slots, into the original real data.

Therefore, if real data is of a size that can be stored in one polling response frame, by using the sequence of the SDD process as it is, the real data can be transmitted from the target to the initiator in a short communication time.

Further, even in the case of real data whose size exceeds a size that can be stored in one polling response frame, by using a plurality of polling response frames transmitted in TSN+1 time slots or a plurality of time slots selected from among the TSN+1 time slots, such real data can be also transmitted from the target to the initiator in a short communication time by using the sequence of the SDD process as it is.

Further, in a case where a plurality of polling response frames are transmitted by using a plurality of time slots selected from among TSN+1 time slots, the time slots selected from among the TSN+1 time slots are hidden in secret from devices other than the initiator and the target, thereby making it possible to ensure some level of security.

Further, in a case where an error detection code or error correction code is added to real data, even when, for example, a collision occurs as a result of another device transmitting some data at the timing of the time slot in which the target transmits a polling response frame, and the initiator cannot correctly receive some of a plurality of polling response frames transmitted by the target, error detection or error correction can be performed on the basis of other correctly received polling response frames.

Next, while passive mode communication and simple mode communication are performed in a so-called selective manner in the above-described communication system shown in FIG. 16 or FIG. 27, it is also possible to perform only simple mode communication.

That is, for example, in a communication system such as an IC card system on which a near field communication protocol other than NFCIP-1 is implemented, if a plurality of IC cards as targets exist around an R/W as the initiator, one time slot is assigned to each one of the plurality of IC cards in advance so that there will be no overlap, and each IC card transmits real data requested for by the R/W at the timing of the one time slot assigned to that IC card. It is thus possible to prevent a collision that occurs when pieces of real data transmitted to the R/W respectively from the plurality of IC cards are transmitted at the same timing.

However, if only one time slot is assigned to one IC card that communicates with the R/W even in a case where the IC card system is applied to an application which assumes that, for example, only one IC card communicates with the R/W, only a small amount of data that can be transmitted in one time slot can be transmitted in response to a request for real data from the R/W. Therefore, in order to transmit real data of up to a certain size from the IC card to the R/W, the R/W needs to make a request for real data a plurality of times. This means that it takes up to a certain amount of communication time to transmit real data of up to a certain size from the IC card to the R/W.

Accordingly, even in the case of a communication system on which a near field communication protocol other than NFCIP-1 is implemented, if the communication system is one which is applied to an application that assumes the presence of only one target that communicates with the initiator, for example, and which performs communication using time slots, the communication time required for transmitting real data of up to a certain size can be shortened by performing the above-described simple mode communication.

Figure 30:
FIG. 30 is a diagram showing an example of the configuration of a communication system that performs near field communication in simple mode.

FIG. 30 shows an example of the configuration of a communication system that performs simple mode communication (near field communication) as communication using time slots.

In FIG. 30, the communication system includes communication devices 101 and 102 that can perform simple mode communication, and data exchange of real data is performed by the above-described simple mode communication performed between the communication device 101 as the initiator and the communication device 102 as the target.

It should be noted that in the embodiment shown in FIG. 30, it is assumed that the communication device 101 functions only as the initiator that transmits data by outputting an electromagnetic wave by itself and modulating the electromagnetic wave, and the communication device 102 functions only as the target that transmits data by performing load modulation on the electromagnetic wave outputted by the initiator.

The communication device 101 is configured in the same manner as, for example, the communication device 11 shown in FIG. 17, and the communication device 102 is configured in the same manner as, for example, the communication device 12 shown in FIG. 18.

Next, a description will be given of the simple mode communication performed in the communication system in FIG. 30. For the simplicity of description, it is assumed that, like the communication device 11 in FIG. 16 which complies with NFCIP-1, the communication device 101 as the initiator makes a request for real data to the target by transmitting the polling request frame shown in FIG. 9. Further, it is assumed that, like the communication device 12 in FIG. 16 which complies with NFCIP-1, the communication device 102 as the target transmits real data to the initiator by means of the polling response frame shown in FIG. 10, in reply to the polling request frame from the initiator. Further, it is assumed that the width $T_s$ of time slots, the number of time slots prepared with respect to a single polling request frame, and the like are the same as those in the case of SDD process specified by NFCIP-1.

Figure 31:
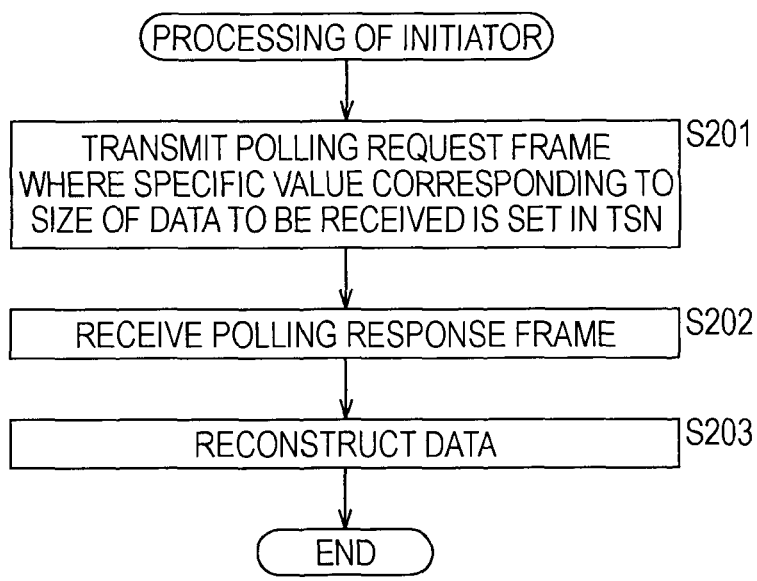
FIG. 31 is a flow chart illustrating the processing of an initiator.

First, referring to the flow chart in FIG. 31, a description will be given of the processing of the communication device 101 as the initiator in a case where, as shown in FIG. 21, one or more polling request frames are used for communication in simple mode.

The control section 29 (FIG. 17) of the communication device 101 as the initiator controls the individual blocks of the communication device 101 so as to start outputting an electromagnetic wave. Then, in step S201, in the same manner as in step S125 of FIG. 22, the control section 29 controls the individual blocks of the communication device 11 so as to transmit a polling request frame (FIG. 9) with a 1-byte value set in the time slot information TSN.

That is, in step S201, a polling request frame where a size-corresponding value of 1 byte corresponding to the size of real data received by the communication device 101 as the initiator from the target, is transmitted.

In the communication system in FIG. 16 or FIG. 27, since passive mode communication can also be performed in addition to simple mode communication, in a case where simple mode communication is performed, a specific value, which is a 1-byte value other than the standard values specified by NFCIP-1 as values that should be set in the time slot information TSN in passive mode communication (SDD process), is set in the time slot information TSN. However, since passive mode communication is not performed in the communication system in FIG. 30, an arbitrary 1-byte value can be set in the time slot information TSN.

When a polling request frame with a value set in the time slot information TSN is transmitted in step S201, the process proceeds to step S202, where the control section 29 controls the individual blocks of the communication device 101 so as to receive polling response frames transmitted from the target.

That is, as will be described later, the target that has received the polling request frame with a value set in the time slot information TSN will transmit TSN+1 polling response frames where TSN+1 blocks obtained by splitting real data into 8 bytes corresponding to the size of Pad are respectively set in their Pads, at the respective timings of time slots #0 to #TSN. Accordingly, in step S202, each of the TSN+1 polling response frames transmitted at the respective timings of the time slots #0 to #TSN is received.

Then, the process proceeds to step S203, where the control section 29 combines the TSN+1 blocks respectively included in the TSN+1 polling response frames to reconstruct the original real data, thereby acquiring real data from the target.

Figure 32:
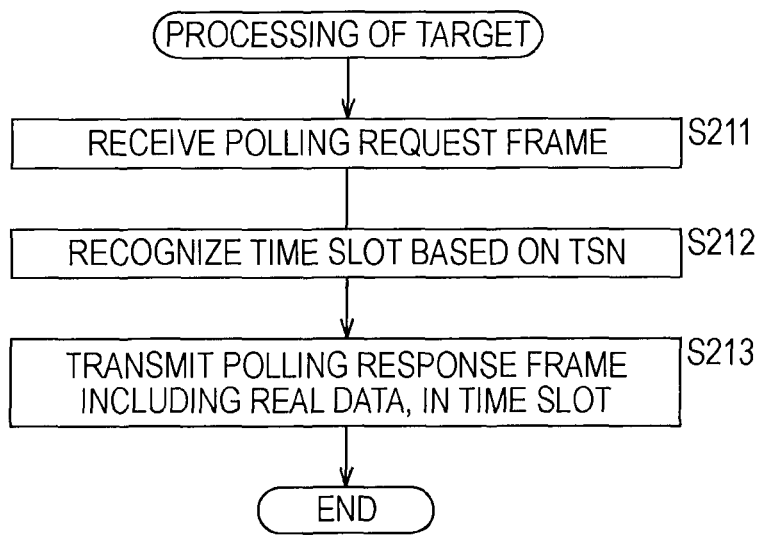
FIG. 32 is a flow chart illustrating the processing of a target.

Next, referring to the flow chart in FIG. 32, a description will be given of the processing of the communication device 102 as the target in a case where, as shown in FIG. 21, one or more polling request frames are used for communication in simple mode.

For example, when the communication device 101 as the initiator starts outputting an electromagnetic wave, and the communication device 102 as the target is brought close to the initiator, the power supply section 48 (FIG. 18) of the communication device 102 draws power from the electromagnetic wave from the initiator and supplies the power to the individual blocks of the communication device 102. Accordingly, the communication device 102 becomes operable.

When the communication device 102 becomes operable, in step S211, the control section 49 (FIG. 18) controls the individual blocks of the communication device 102 so as to receive a polling request frame transmitted from the initiator.

Then, in step S212, the control section 49 recognizes the time slot information TSN included in the polling request frame (FIG. 9) from the initiator, and on the basis of the time slot information TSN, recognizes the number TSN+1 of time slots to be used for the transmission of real data, and the process proceeds to step S213.

In step S213, the control section 49 controls the individual blocks of the communication device 102 so as to transmit, for example, TSN+1 polling response frames respectively including TSN+1 blocks obtained by splitting real data into parts having the size of Pad, at the respective timings of the N+1 time slots #0 to #TSN that are set in advance with respect to the time slot information TSN. That is, a polling response frame where the i-th block (i=1, 2, ..., TSN+1) of the TSN+1 blocks is set in Pad is transmitted from the target to the initiator at the timing of a time slot #i−1.

As described above, by using a plurality of polling response frames, real data of up to a certain size can be transmitted from the communication device 102 as the target to the communication device 101 as the initiator in a short communication time.

Next, referring to the flow chart in FIG. 33, a description will be given of the processing of the communication device 101 (FIG. 30) as the initiator in a case where, as shown in FIG. 24, simple mode communication is performed by using N time slots selected from among the time slots #0 to #TSN.

The control section 29 (FIG. 17) of the communication device 101 as the initiator controls the individual blocks of the communication device 101 so as to start outputting an electromagnetic wave. Then, in step S201, the control section 29 controls the individual blocks of the communication device 11 so as to transmit a polling request frame (FIG. 9) with a 1-byte value set in the time slot information TSN.

In this case as well, as described above with reference to FIG. 25, the N time slots of the time slots #0 to #TSN, which are used for the target to transmit polling response frames, are set in advance for the communication device 101 as the initiator and the communication device 102 as the target with respect to each value of time slot information TSN.

Then, in step S221, a polling request frame including time slot information TSN in which a value corresponding to the N time slots used for the transmission of polling response frames is set, is transmitted.

After the transmission of a polling response frame in step S221, the process proceeds to step S223, where the control section 29 controls the individual blocks of the communication device 101 so as to receive polling response frames transmitted from the target.

That is, the target that has received the polling request frame with a value set in the time slot information TSN will transmit N polling response frames including (blocks obtained by splitting) real data, at the respective timings of the N time slots of the time slots #0 to #TSN which are set in advance with respect to the time slot information TSN. Accordingly, in step S223, each of the N polling response frames transmitted at the respective timings of the N time slots is received.

Then, the process proceeds to step S225, where the control section 29 combines the N blocks respectively included in the N polling response frames to reconstruct the original real data, thereby acquiring real data from the target.

Next, referring to the flow chart in FIG. 34, a description will be given of the processing of the communication device 102 (FIG. 30) as the target in a case where, as shown in FIG. 24, simple mode communication is performed by using N time slots selected from among the time slots #0 to #TSN.

For example, when the communication device 101 as the initiator starts outputting an electromagnetic wave, and the communication device 102 as the target is brought close to the initiator, the power supply section 48 (FIG. 18) of the communication device 102 draws power from the electromagnetic wave from the initiator and supplies the power to the individual blocks of the communication device 102. Accordingly, the communication device 102 becomes operable.

When the communication device 102 becomes operable, in step S231, the control section 49 (FIG. 18) controls the individual blocks of the communication device 102 so as to receive a polling request frame transmitted from the initiator.

Then, in step S232, the control section 49 recognizes the time slot information TSN included in the polling request frame (FIG. 9) from the initiator, and on the basis of the time slot information TSN, recognizes the number TSN+1 of time slots to be used for the transmission of real data, and the process proceeds to step S233.

In step S233, the control section 49 selects N time slots used for the transmission of polling response frames, where N is 2 or larger and TSN+1 or smaller, from among the TSN+1 time slots #0 to #TSN, that is, selects the N time slots set in advance with respect to the time slot information TSN, and the process proceeds to step S234.

In step S234, the control section 49 controls the individual blocks of the communication device 102 so as to, for example, split real data into N blocks and transmit N polling response frames respectively including the N blocks at the respective timings of the N time slots selected in step S234.

It should be noted that in this case, it is assumed that the size of each block obtained by splitting real data into N blocks is equal to or less than the size of Pad.

In this way, by transmitting polling response frames by using all of the TSN+1 time slots #0 to #TSN, or N time slots selected from among the time slots #0 to #TSN, data of up to a certain size can be transmitted from the target to the initiator.

Further, in a case where polling response frames are transmitted by using N time slots selected from among TSN+1 time slots #0 to #TSN, with respect to the time slot information TSN, the N time slots used for the transmission of polling response frames are hidden in secret from devices other than the communication devices 101 and 102 (FIG. 30). Accordingly, devices other than the communication devices 101 and 102 cannot tell at the timing of which time slot a polling response frame including (blocks of) real data will be transmitted. From this point of view, it can be said that enhanced security is achieved.

In the communication system in FIG. 30, it is assumed that only one target, the communication device 102, serves as the party with which the communication device 101 as initiator communicates. However, if specified in advance, a plurality of targets may serve as the parties with which the initiator communicates instead of one target, and simple mode communication can be performed between each of the plurality of targets and the initiator.

For the initiator and each of the plurality of targets, a channel table as shown in FIG. 29 associated with each value of time slot information TSN is set (stored) in advance. In accordance with the size of real data received from the target, for example, the initiator transmits a polling request frame including time slot information TSN of a value that allows use of a channel constituted by the number of time slots necessary for transmitting real data of that size.

On the other hand, the i-th target #i of a plurality of targets receives a polling request frame from the initiator, and on the basis of a channel table associated with the time slot information TSN included in that polling request frame, recognizes time slots constituting the channel #i to be used by itself, and transmits polling response frames including (blocks obtained by splitting) real data by using the time slots.

Figure 33:
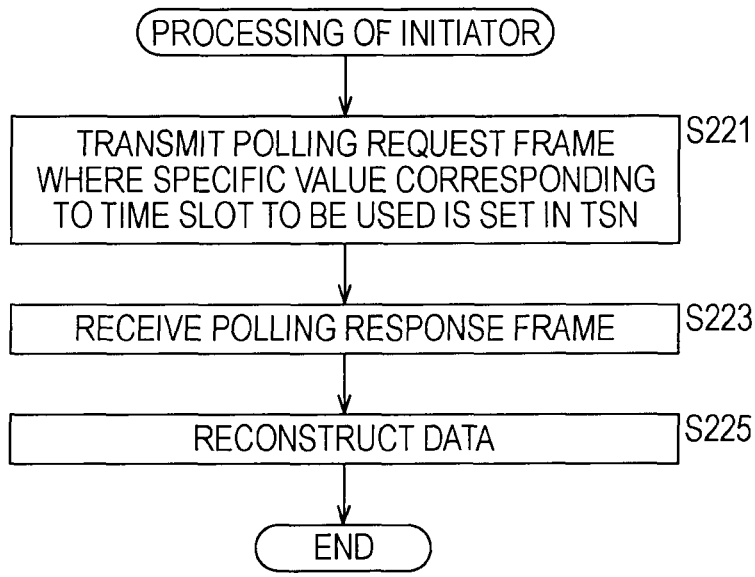
FIG. 33 is a flow chart illustrating the processing of an initiator.

Specifically, for example, provided that M targets #1 to #M are the parties with which the communication device 101 as the initiator communicates, the communication device 101 as the initiator performs the same processing as that described in the flow chart of FIG. 33.

It should be noted, however, that in step S221 of FIG. 33, in accordance with the size of real data received from each of the plurality of targets #1 to #M, a polling request frame including time slot information TSN of a value that allows use of a channel constituted by the number of time slots necessary for each of the targets #1 to #M to transmit real data of that size, is transmitted.

Further, in step S225, in the communication device 101 as the initiator, the time slots in which the plurality of targets #1 to #M respectively transmit polling response frames are recognized by referring to the channel table (FIG. 29). Accordingly, for each one of the plurality of targets #1 to #M, blocks included in each of one or more polling response frames transmitted from that target are combined to reconstruct the original real data.

Figure 34:
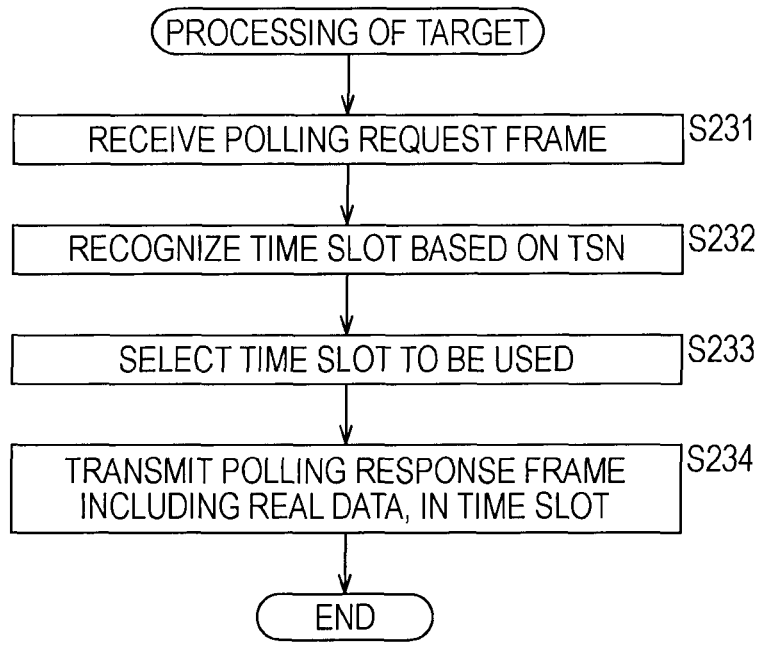
FIG. 34 is a flow chart illustrating the processing of a target.

On the other hand, each of the plurality of targets #1 to #M performs the same processing as that described in the flow chart of FIG. 34.

It should be noted, however, that in step S233 of FIG. 34, on the basis of the channel table corresponding to the time slot information TSN included in a polling request frame from the communication device 101 as the initiator, for example, the communication device 102 as the i-th target #i of the targets #1 to #M recognizes (selects) one or more time slots constituting the channel #i that should be used by itself.

Further, in step S233, provided that the number of time slots constituting the channel #i is N, the target #i splits real data into N blocks, and transmits N polling response frames respectively including the N blocks at the respective timings of the N time slots constituting the channel #i.

As described above, even when there are a plurality of targets with which the initiator communicates, simple mode communication can be performed between each of the plurality of targets and the initiator.

It should be noted that in the communication system in FIG. 30, as in the communication system in FIG. 16 or FIG. 27, an error detection code or error correction code can be added to real data included in a polling response frame. Further, real data may be interleaved. Further, the channel table can be changed at a predetermined time interval.

It should be noted that, in this specification, the processing steps describing a program for causing a computer (including a processor such as a CPU or DSP (Digital Signal Processor)) to execute various kinds of processing do not always need to be time-sequentially performed in the order as written in the flow charts, but also include processes executed in parallel or individually (for example, parallel processes or object-oriented processes).

The programs may be processed by either a single computer or a plurality of computers in a distributed manner.

It is to be understood that embodiments of the present invention are not limited to the above-described embodiments, and various modifications are possible without departing from the scope of the present invention.

The invention claimed is:

1. A communication system, comprising:
an initiator as a communication device that starts a communication by outputting an electromagnetic wave, and transmits a command via the electromagnetic wave, the command including time slot information; and
a target as a communication device that transmits a response to the command by load-modulating the electromagnetic wave, wherein
the initiator is configured to perform a first mode communication to acquire real data, the first mode communication including transmitting the command and receiving a response to the command, the response transmitted by the target at a timing of any one of one or more time slots and including the real data,
the initiator has first means for causing the command to be transmitted with a first value in the time slot information when the first mode communication is performed and for causing the command to be transmitted with a second value in the time slot information when a second mode communication is performed, and
the target has
means for recognizing the time slot information included in the command from the initiator, and
second means for causing the response including the real data to be transmitted at a timing of a preset time slot, in response to a recognition that the time slot information has the first value,
the second means causing a response including an attribute of the target to be transmitted and causing a response including the real data to be transmitted based on the attribute, when the time slot information has the second value.

2. The communication system according to claim 1, wherein, when the target transmits the real data by splitting the real data into a plurality of responses transmitted at a timing preset with respect to a second value in the time slot information, each of the plurality of responses is received, and the real data in its original form is reconstructed from the plurality of responses.

3. A communication system, comprising:
an initiator as a communication device that starts a communication by outputting an electromagnetic wave, and transmits a command via the electromagnetic wave, the command including time slot information; and
a target as a communication device that transmits a response to the command by load-modulating the electromagnetic wave, wherein
the initiator is configured to perform a first mode communication to acquire real data, the first mode communication including transmitting the command and receiving a response to the command, the response transmitted by the target at a timing of any one of one or more time slots and including the real data,
the initiator has means for causing the command to be transmitted with a first value in the time slot information when the first mode communication is performed,
the target has
means for recognizing the time slot information included in the command from the initiator, and
means for causing the response including the real data to be transmitted at a timing of a preset time slot, when the time slot information has the first value, and, when a plurality of time slots that should be used by each of a plurality of targets are preset with respect to the first value set in the time slot information, and each of the plurality of targets transmits each of a plurality of responses at a timing of each of the plurality of time slots that should be used by the target, each of the plurality of responses transmitted from each of the plurality of targets at a timing of each of the plurality of time slots that should be used by the target is received, and the real data in an original form from each of the plurality of targets is reconstructed.

4. A communication system, comprising:
an initiator as a communication device that starts a communication by outputting an electromagnetic wave, and transmits a command via the electromagnetic wave, the command including time slot information; and
a target as a communication device that transmits a response to the command by load-modulating the electromagnetic wave, wherein
the initiator is configured to perform a first mode communication to acquire real data, the first mode communication including transmitting the command and receiving a response to the command, the response transmitted by the target at a timing of any one of one or more time slots and including the real data,
the initiator has means for causing the command to be transmitted with a first value in the time slot information when the first mode communication is performed,
the target has
means for recognizing the time slot information included in the command from the initiator, and
means for causing the response including the real data to be transmitted at a timing of a preset time slot, when the time slot information has the first value,
when the target transmits the real data by splitting the real data into a plurality of responses transmitted at a timing preset with respect to a second value in the time slot information, each of the plurality of responses is received, and the real data in its original form is reconstructed from the plurality of responses, and,
when the target transmits data having an error correction code or error detection code added to the real data, by splitting the data into a plurality of responses, each of the plurality of responses of the data is received, and an error in the real data is corrected or detected by using the error correction code or error detection code.

5. A communication system, comprising:
an initiator as a communication device that starts a communication by outputting an electromagnetic wave, and transmits a command via the electromagnetic wave, the command including time slot information; and a target as a communication device that transmits a response to the command by load-modulating the electromagnetic wave, wherein the initiator is configured to perform a first mode communication to acquire real data, the first mode communication including transmitting the command and receiving a response to the command, the response transmitted by the target at a timing of any one of one or more time slots and including the real data, the initiator has means for causing the command to be transmitted with a first value in the time slot information when the first mode communication is performed, the target has means for recognizing the time slot information included in the command from the initiator, and means for causing the response including the real data to be transmitted at a timing of a preset time slot, when the time slot information has the first value, and, when a size of the real data exceeds a predetermined size, the target sets a second mode communication that enables an exchange of the size of the real data larger than the predetermined size.

6. A target device, comprising:

an antenna that receives, in a first mode communication, an electromagnetic wave modulated with a command, the command including a first value in time slot information, and, in a second mode communication, an electromagnetic wave modulated with a command including a second value in the time slot information;

a load modulating section that load-modulates the electromagnetic wave to transmit, in the first mode communication, a response to the command, the response transmitted at a timing of any one of one or more time slots and including real data; and a processing unit configured to recognize the time slot information included in the command and to cause the response to be transmitted at a timing of a preset time slot, in response to the processing unit recognizing the time slot information has the first value, the processing unit further configured to cause a response including an attribute of the target device to be transmitted and to cause a response including the real data to be transmitted based on the attribute, when the processing unit recognizes the time slot information has the second value.

7. A communication method for a communication device, comprising: the communication device:

causing a command to be transmitted, via an electromagnetic wave, with a first value in time slot information when a first mode communication is performed;

causing the command to be transmitted, via an electromagnetic wave, with a second value in the time slot information when a second mode communication is performed;

recognizing the time slot information included in the command;

causing a response to be transmitted at a timing of a preset time slot, in response to a recognition that the time slot information has the first value;

transmitting the response by load-modulating the electromagnetic wave, the response transmitted at a timing of any one of one or more time slots and including real data;

causing a response including an attribute to be transmitted, and causing a response including the real data to be transmitted based on the attribute, when the recognizing recognizes the time slot information has the second value; and receiving, in the first mode communication, the response.

* * * * *